United States Patent [19]
Sugiyama et al.

[11] Patent Number: 6,069,995
[45] Date of Patent: May 30, 2000

[54] VIDEO DATA RECORDING AND REPRODUCING APPARATUS AND METHOD OF SAME

[75] Inventors: Akira Sugiyama; Tetsuya Iwamoto, both of Kanagawa, Japan

[73] Assignee: Sony Corporation, Tokyo, Japan

[21] Appl. No.: 08/862,064

[22] Filed: May 22, 1997

[30] Foreign Application Priority Data

May 22, 1996 [JP] Japan .................................. 8-127384

[51] Int. Cl.$^7$ ............................. H04N 5/92; H04N 5/76
[52] U.S. Cl. ........................................... 386/124; 386/109
[58] Field of Search .................................... 386/124, 109, 386/111, 112, 95, 113, 114, 46, 76, 1, 27, 33, 40; 360/32; H04N 5/92, 5/76

[56] References Cited

U.S. PATENT DOCUMENTS 5,418,658 5/1995 Kwon ......................................... 360/48

*Primary Examiner*—Robert Chevalier
*Attorney, Agent, or Firm*—Frommer Lawrence & Haug, LLP; William S. Frommer

[57] ABSTRACT

A video data recording and reproducing apparatus with which the quality of the video is not lowered even if the compressed video data is recorded in an overlapped manner without accurate matching of boundaries of the GOP's, wherein a recording position control unit controls a recording system so that the recording start position is made earlier by exactly an amount of one GOP where the recording start position of the top data is recorded from the position immediately before the recording start GOP of the bottom data, the recording end position is made later by exactly the amount of one GOP where the recording of the recording end position of the top data in ended at the position immediately before the recording end GOP of the bottom data, and the recording start position is made later by exactly the amount of one GOP where the recording of the recording end position of the top data is ended at the position two GOP's before the recording start GOP of the bottom data. Further, the recording position control unit controls the input data switching unit and records the video data reproduced in advance in the part at which the recording position is altered as it is.

8 Claims, 24 Drawing Sheets

GOP STRUCTURE

REDUCTIONED DATA

SYNC BLOCK

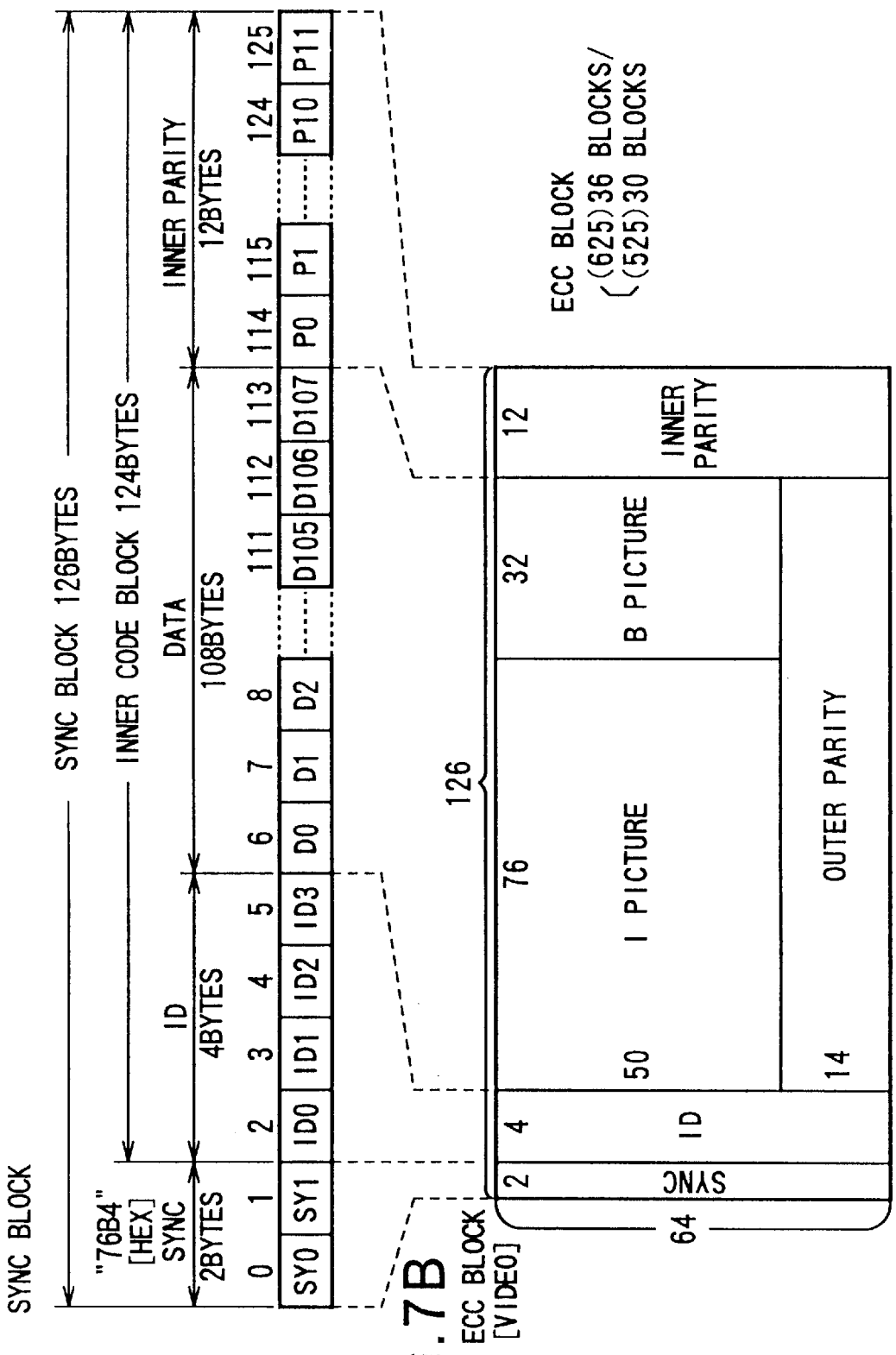

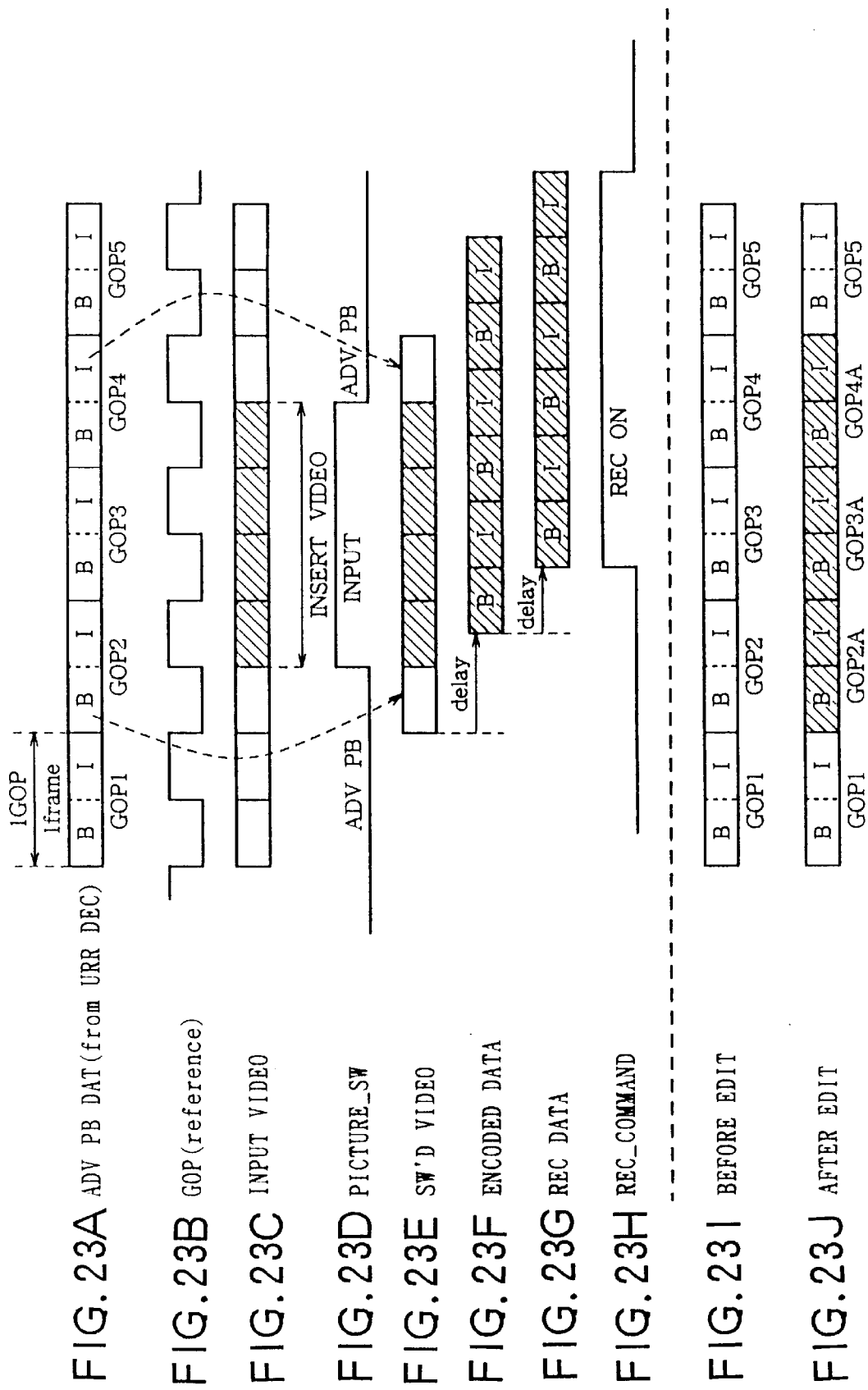

VIDEO DATA RECORDING AND REPRODUCING APPARATUS AND METHOD OF SAME

BACKGROUND OF THE INVENTION

Field of the Invention

The present invention relates to a video data recording and reproducing apparatus for recording in an overlapping manner new video data on a video tape (VTR tape) or other tape recording medium on which video data has been already recorded and to a method of the same.

The MPEG (Motion Picture Experts Group) system and other compression and coding systems for compressing and coding video data of a digital format in units of GOP's (group of pictures) comprised of a plurality of frames are now being put into practical use.

Digital cassette tape recorders (VCR's) able to compress and code video data by the MPEG system or the like and record the compressed video data on digital VTR tape housed in a cassette and able to reproduce, expand, and decode such recorded compressed video data are accordingly also being developed and marketed.

When editing several scenes worth of video data of a movie, it is necessary to record new compressed video data (top data) in an overlapping manner on a VTR tape on which video data compressed and coded in units of GOP's (bottom data) have been already recorded (perform "editing recording"). When performing such editing recording, at the boundary between the bottom data and the top data (editing point), the recording position of the boundary of the GOP's of the top data on the VTR tape and the recording position of the boundary of the bottom data must be accurately matched or else part of the bottom data will be lost and the quality of the video after reproduction will be lowered. Accordingly, when performing such editing recording, it is necessary to record the data on the VTR tape while accurately matching the boundaries of the GOP's of the top data and bottom data at the editing point.

However, VTR tape stretches or contracts. Also, there are limits to the mechanical precision of the tape travelling systems which can be achieved among a number of VCR's. Therefore, when performing the editing recording, it is difficult to accurately match the boundaries of GOP's of the top data and bottom data at the editing point.

One idea could be to precisely control the travel of the VTR tape when performing the editing recording so as to match the boundaries of the GOP's of the bottom data and the top data at the editing point taking into consideration the stretching or contraction of the VTR tape. However, when trying to match the boundaries of the GOP's at the editing point by precision control of the travel of the VTR tape, the processing relating to the control of the travel of the tape becomes difficult and, in addition, a high mechanical precision is demanded in the tape travelling system.

SUMMARY OF THE INVENTION

An object of the present invention is to provide a video data recording and reproducing apparatus with which the quality of the video after reproduction is not lowered even if the boundaries of the GOP's of the video data (bottom data) which has been already recorded on the VTR tape and the video data (top data) to be newly recorded in an overlapping manner are not precisely matched when recording a plurality of sets of video data in an overlapping manner and a method of the same.

Another object of the present invention is to provide a video data recording and reproducing apparatus with which a reduction of the quality of the video at an editing point can be prevented without a necessity of a high precision in the control of the tape travel or a high mechanical precision in the tape travelling system and a method of the same.

To attain the above objects, according to a first aspect of the present invention, there is provided a video data recording and reproducing apparatus including a video data accommodating means for accommodating video data in a predetermined part of a predetermined recording block in predetermined recording units containing one or more frames; an error correction code adding means for generating an error correction code which enables reproduction of each of the recording units of the video data housed in the recording block even if two or more helical tracks worth of data is lost for every recording unit and adding the same to a predetermined part of the recording block; a start/end identification data adding means for adding start/end identification data indicating the start or recording and the end of recording of the video data to a predetermined part of the recording block; a recording means for recording each of the recording blocks accommodating the recording units of the video data and to which the error correction code and the start/end identification data are added over a plurality of helical tracks of the tape recording medium; and a reproducing means for reproducing the recording blocks which have been already recorded on the tape recording medium, wherein when recording other video data (top data) on a tape recording medium on which video data (bottom data) has already been recorded, the recording means starts or ends the recording at a position of the tape recording medium at which the loss of the top data and the bottom data caused due to the recording of the top data does not exceed the error correction capability of the error correction code in accordance with the start/end identification data which had been added to the reproduced recording blocks accommodating the bottom data and the recording blocks accommodating the top data.

Preferably, the recording means starts the recording of the recording blocks accommodating the recording units of the top data, when the start/end identification data added to a recording block accomodating the bottom data indicates the start of the bottom data, from a helical track after the helical track of the tape recording medium on which the next recording block for accommodating the bottom data is recorded; ends the recording of the recording blocks accommodating the recording units of the top data, when the start/end identification data added to a recording block accommodating the bottom data indicates the end of the bottom data, before the helical track of the tape recording medium on which the immediately previous recording block accommodating the bottom data is recorded; ends the recording of the recording block accommodating the recordings unit of the top data, when the start/end identification data added to a recording block accommodating the bottom data indicates the start of the bottom data, at a helical track before the helical track of the tape recording medium on which the previous recording block accommodating the bottom data by two is recorded; starts the recording of the recording blocks accommodating the recording units of the top data, when the start/end identification data added to a recording block accommodating the bottom data indicates the start of the bottom data, after the helical track of the tape recording medium on which the next recording block accommodating the bottom data is recorded; and records the recording blocks reproduced from the tape recording medium by the reproducing means on the helical tracks adjoining the positions of the tape recording medium starting and ending the recording of the top data.

Preferably, further provision is made of a separating means for separating the recording units of the video data, the error correction code, and the start/end identification data from each of the reproduced recording blocks and an error correcting means for performing error correction on the recording units of the video data using the separated error correction code.

Preferably, the reproducing means has a plurality of data reading means each of which has two reproducer heads scanning the tape recording medium at one helical track's worth of distance from each other for reading the recording blocks from the helical tracks of the tape recording medium by both of the reproducer heads regardless of the position of the track; the separating means separates the recording units of the video data, the error correction code, and the start/end identification data from each of the recording blocks as read by both of the two reproducer heads of the plurality of data reading means; the error correcting means performs the error correction on the recording units of the video data separated from each of the recording blocks as read by both of the two reproducer heads of the plurality of data reading means; and there is further provided a selecting means for selecting with priority the video data in which there is no data error from among the video data separated from each of the recording blocks read as by both of the two reproducer heads of the plurality of data reading means.

Preferably, further provision is made of a compressing means for compressing the video data in the recording units and an expanding means for expanding the error-corrected video data.

The video data accommodating means houses GOP's (recording units) of the video data compressed and coded by for example the MPEG system at a predetermined part of predetermined recording blocks used when performing recording on a tape recording medium such as a VTR tape.

The error correction code adding means generates, for each of the GOP's of the video data, an error correction code having an error correction capability enabling reproduction of lost video data even in a case where video data to be recorded in an overlapping manner (top data) on video data which has been already recorded on the VTR tape (bottom data) is recorded without an accurate match of the boundaries of the GOP's at a boundary (editing point) where for example a plurality of sets of video data are connected and adds the same to the predetermined part of the recording blocks.

The start/end identification data adding means adds start/end identification data indicating that the bottom data and top data end at recording blocks to predetermined parts of the recording blocks in which the last GOP's of the bottom data and the top data are housed and adds start/end identification data indicating that the bottom data and top data start from recording blocks to predetermined parts of the recording blocks in which the first GOP's of the bottom data and the top data are housed.

When recording video data on the tape recording medium, the reproducing means reproduces the recording blocks recorded on the tape recording medium and separates the start/end identification data of the recording blocks containing at least the bottom data.

The recording means records the recording blocks accommodating the video data in units of GOP's and to which the error correction code and start/end identification data have been added in the above way over a plurality of helical tracks of the tape recording medium. When recording top data on the bottom data in an overlapping manner, the recording means starts and ends the recording at positions of the tape recording medium where the losses of the top data and bottom data which would be caused due to the recording of the top data would not exceed the error correction capability of the error correction code in accordance with the start/end identification data added to the recording blocks accommodating the bottom data reproduced by the reproducing means and the recording blocks accommodating the top data to be recorded.

More specifically, the recording means starts the recording of the recording blocks accommodating the recording units of the top data, when the start/end identification data added to a reproduced recording block (k-th recording block, where k is an integer) indicates the start of the bottom data, after the helical track on which the (k+1)-th recording block is recorded.

Also, the recording means ends the recording of the recording block accommodating the last recording unit of the top data, when the start/end identification data added to a reproduced k-th recording block indicates the end of the bottom data, before the helical track on which the (k−1)-th recording block in recorded.

Further, the recording means ends the recording of the recording block housed the last recording unit of the top data, when the start/end identification data added to a reproduced k-th recording block indicates the start of the bottom data, before the helical track of the tape recording medium on which the (k−2)-th recording block is recorded.

Furthermore, the recording means starts the recording of the recording block accommodating the first recording unit of the top data, when the start/end identification data added to a k-th recording block indicates the end of the bottom data, after the helical track of the tape recording medium on which the (k+2)-th recording block is recorded.

In this way, the recording means adjusts the recording positions in accordance with the start/end identification data so as to prevent a loss of more than two helical tracks worth of data, for which correction by the error correction code is impossible, in the k-th recording block and thereby prevent a reduction of the quality of the video after reproduction and, further, records the recording blocks reproduced from the tape recording medium by the reproducing means as they are on the helical tracks for which the start/end positions of recording have been adjusted so as to prevent a change of the start/end time of the top data.

Further, when the video data recording and reproducing apparatus according to the present invention reproduces the video data recorded on the tape recording medium as mentioned above, the reproducing means uses a plurality of data reading means, each having two reproducer heads for scanning the tape recording medium at one helical track's worth of distance, to read the recording blocks from the helical tracks by both of the reproducer heads regardless of the position of the tracks, the separating means separates the recording units of the video data, error correction code, and the start/end identification data from each of the recording blocks as read by the two reproducer heads of the plurality of data reading means of the reproducing means, the error correcting means performs the error correction on the recording units of the video data separated from each of the recording blocks as read by the two reproducer heads of the plurality of data reading means, and the selecting means selects the video data in which there is no data error among the video data separated from the recording blocks as read by the two reproducer heads of the plurality of data reading means and thereby reproduces the video data using so-called nontracking control and can reproduce all of the recorded video data even without accurately tracing the helical tracks of the tape recording medium.

According to a second aspect of the present invention, there is provided a video data recording and reproducing apparatus including a reproducing means for reproducing video data (bottom data) which had been already recorded on a predetermined tape recording medium preceding the recording of new noncompressed video data (top data) to be input on the tape recording medium; a switching means for switching and outputting the reproduced bottom data and the top data in units of frames; a compressing means for compressing the switched and output bottom data and top data in units of GOP's; and a recording means for recording the compressed bottom data and top data on the tape recording medium.

According to a third aspect of the invention, there is provided a video data recording and reproducing method including the steps of accommodating video data in a predetermined part of a predetermined recording block in predetermined recording units containing one or more frames; generating an error correction code which enables reproduction of each of the recording units of the video data housed in the recording block even if two or more helical tracks worth of data is lost for every recording unit and adding the same to a predetermined part of the recording block; adding start/end identification data indicating the start or recording and the end of recording of the video data to a predetermined part of the recording block; recording each of the recording blocks accommodating the recording units of the video data and to which the error correction code and the start/end identification data are added over a plurality of helical tracks of the tape recording medium; and reproducing the recording blocks which have been already recorded on the tape recording medium, wherein when recording other video data (top data) on a tape recording medium on which video data (bottom data) has already been recorded, the recording is started or ended at a position of the tape recording medium at which the loss of the top data and the bottom data caused due to the recording of the top data does not exceed the error correction capability of the error correction code in accordance with the start/end identification data which had been added to the reproduced recording blocks accommodating the bottom data and the recording blocks accommodating the top data.

BRIEF DESCRIPTION OF THE DRAWINGS

These and other objects and features of the present invention will become clear from the following description of the preferred embodiments given with reference to the attached drawings, in which:

FIGS. 7A to 7D are views of the configuration of the recording block unit shown in FIGS. 6A to 6C in the case where a pack circuit shown in FIG. 2 multiplexes compressed video data and noncompressed audio data;

FIGS. 23A to 23J are views of the operation of the VCR (FIG. 13 to FIG. 15) according to a third embodiment.

DESCRIPTION OF THE PREFERRED EMBODIMENTS

First Embodiment

Below, an explanation will be made of a first embodiment of the present invention.

Figure 1:
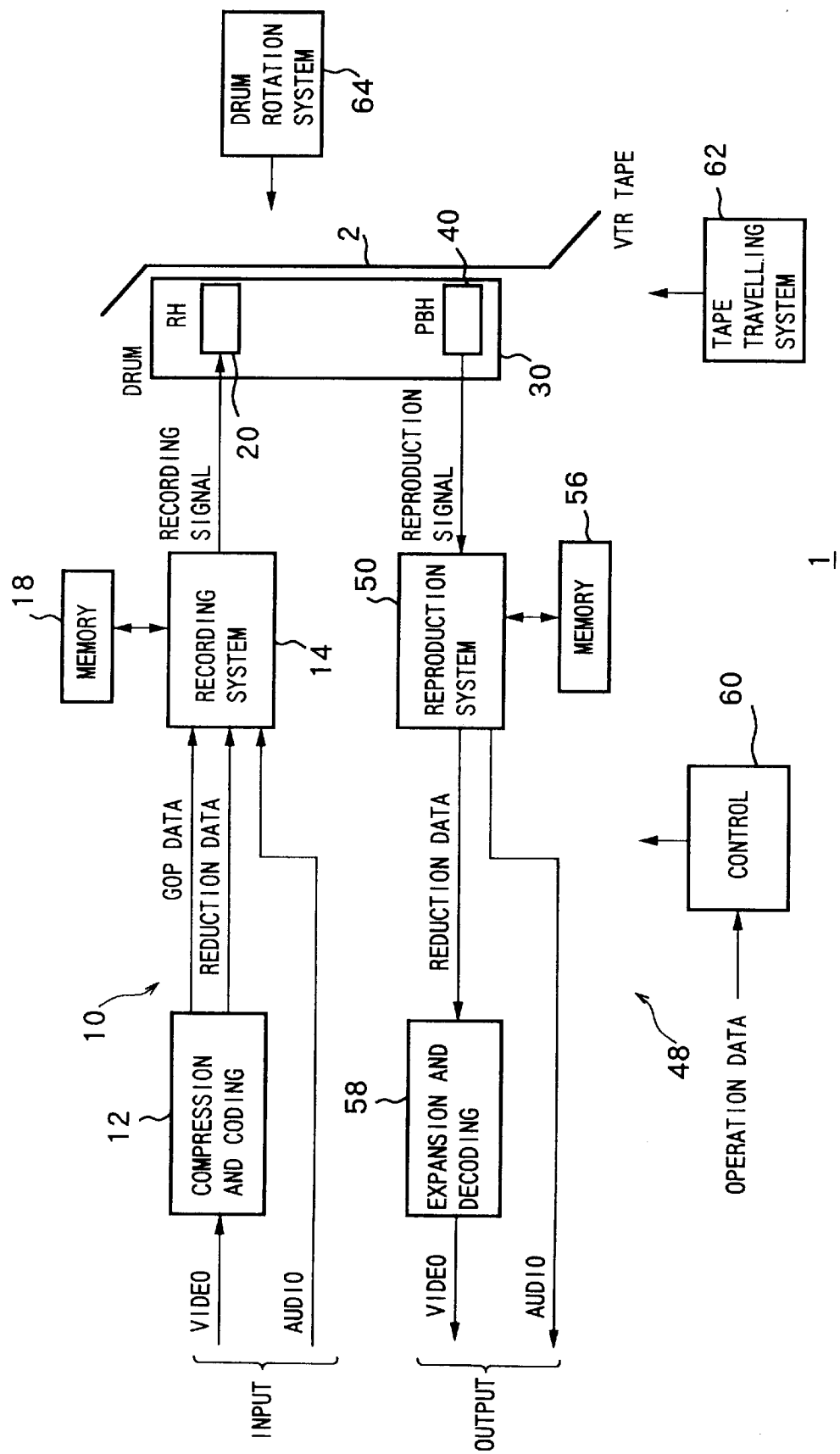
FIG. 1 is a view of the configuration of a video cassette recorder (VCR) according to a first embodiment of the present invention.

FIG. 1 is a view of the configuration of a video cassette recorder (VCR) 1 according to the present invention.

As shown in FIG. 1, the VCR 1 according to the resent invention is constituted by a recording unit 10, a recording head unit 20, a reproducer head unit 40, a reproduction unit 48, a control unit 60, a tape travelling system 62, and a drum rotation system 64.

The recording unit 10 is constituted by a compression and coding system 12, a recording system 14, and a memory circuit 18.

The reproduction unit 48 is constituted by a reproduction system 50, a memory unit 56, and an expanding end decoding system 58.

The VCR 1 compresses and codes the audio and/or video data input from an external video processing apparatus (not illustrated), for example, an audio and/or video data relay unit and audio and/or video data editing apparatus, in units of predetermined numbers of frames (GOP's) by a compression and coding system such as the MPEG by these parts and further records the video data together with the noncompressed audio data on a VTR tape 2 housed in a cassette similar to a conventional VCR.

Further, the reproduction system 50 of the VCR 1 reads the audio and/or video data recorded on the VTR tape 2 as mentioned above, reproduces the audio and/or video data by a so-called nontracking system (mentioned later), and outputs the same to the external video processing apparatus.

Figure 2:
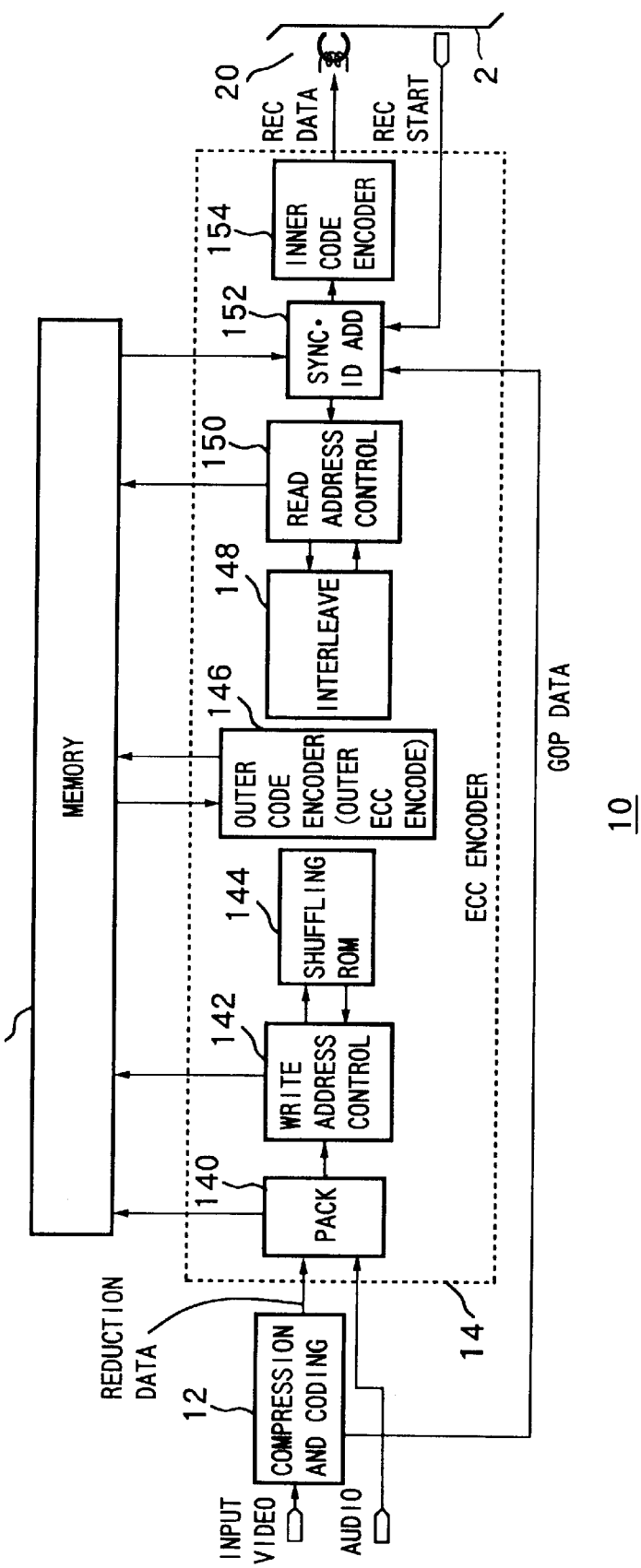
FIG. 2 is a view of the configuration of a recording unit shown in FIG. 1.

FIG. 2 is a view of the configuration of the recording system 14 of the recording unit 10 shown in FIG. 1.

As shown in FIG. 2, the recording system 14 of the recording unit 10 is constituted by a pack circuit 140, a write address control circuit 142, a shuffling ROM circuit 144, an outer code (outer ECC) encoder 146, an interleave ROM circuit 148, a read address control circuit 150, a SYNC ID adding circuit 152, and an inner code (inner ECC) encoder circuit 154.

Figure 3:
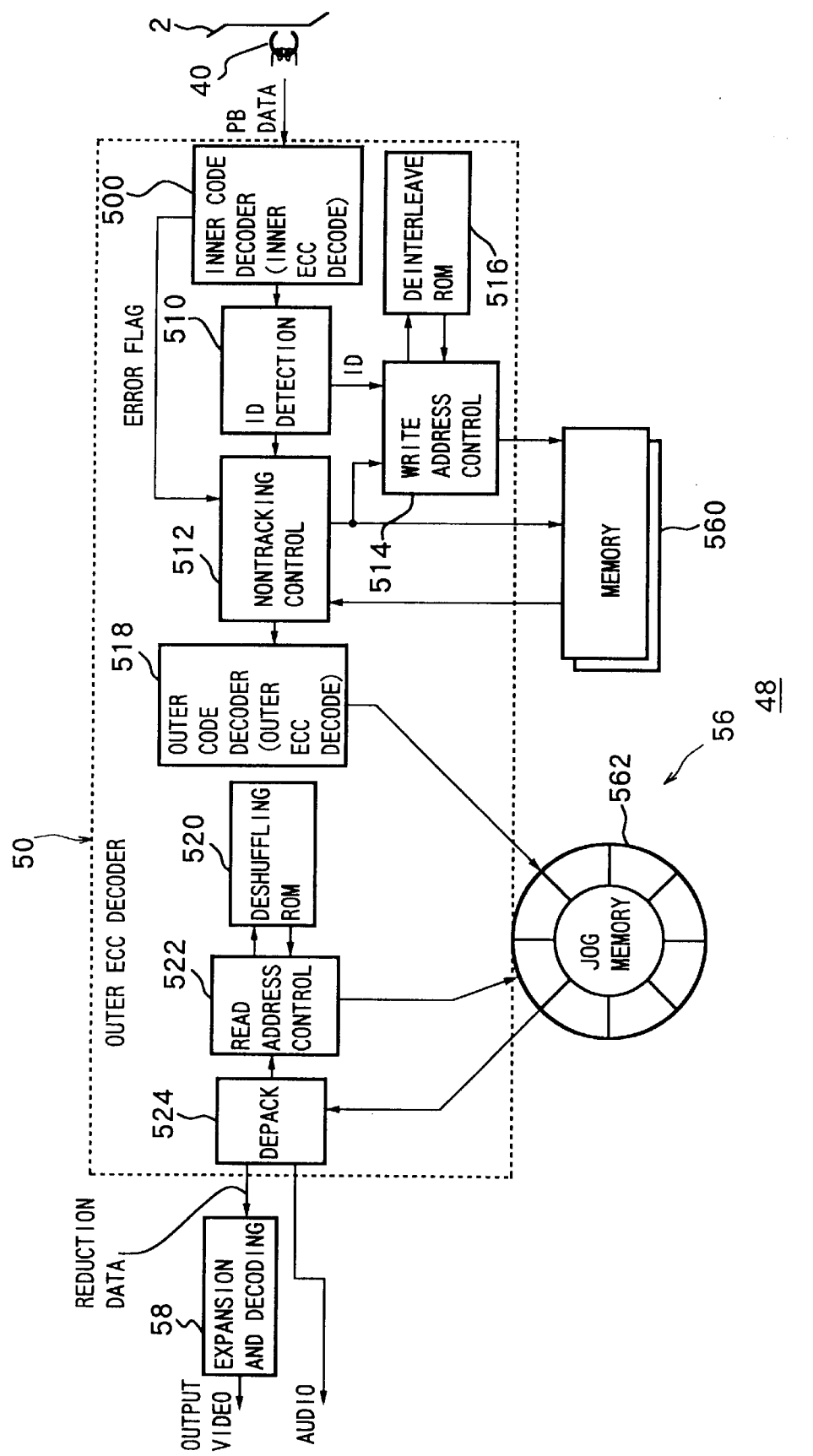
FIG. 3 is a view of the configuration of a reproduction unit shown in FIG. 1.

FIG. 3 is a view of the configuration of the reproduction unit 48 shown in FIG. 1.

As shown in FIG. 3, the reproduction system 50 of the reproduction unit 48 is constituted by an inner code decoder circuit 500, an ID detection circuit 510, a nontracking control circuit 52, a write address control circuit 514, a de-interleaving ROM circuit 516, an outer code decoder circuit 510, a deshuffling ROM circuit 520, a read address control circuit 522, and a de-packing circuit 524. The memory unit 56 of the reproduction unit 48 is constituted by a memory circuit 560 and a jog memory circuit 562.

Figure 4A:
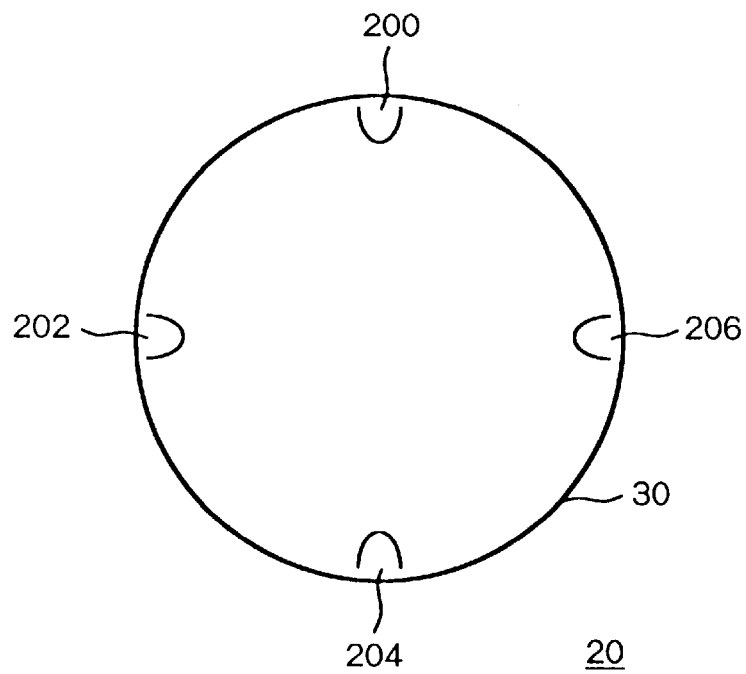
FIGS. 4A and 4B are views illustrating the configuration of a recording head unit and a reproducer head unit shown in FIG. 1 in the case of four heads.
Figure 4B:
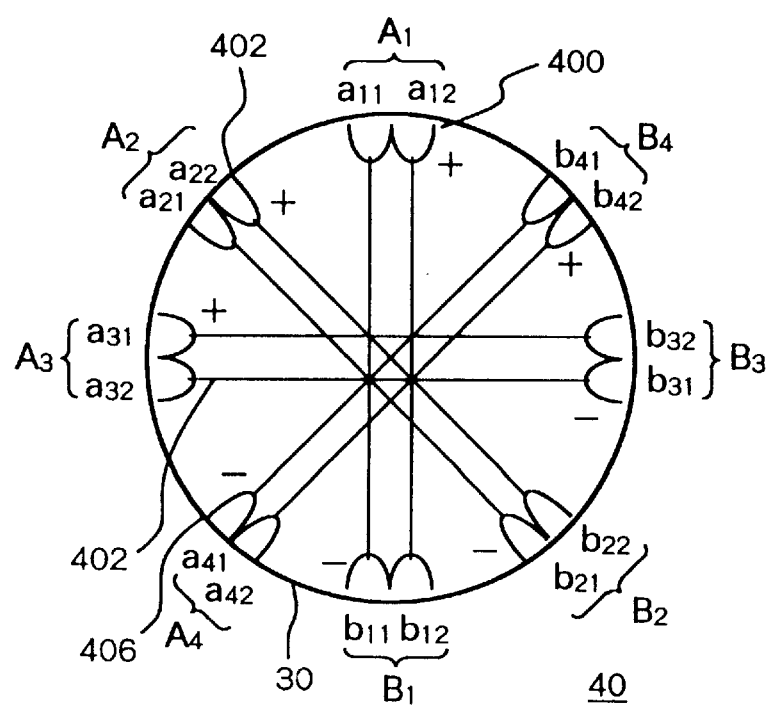

FIGS. 4A and 4B are views illustrating the configuration of the recording head unit 20 and the reproducer head unit 40 shown in FIG. 1 in the case of four heads.

As shown in FIG. 4A, the recording head unit 20 has four recording heads 200, 202, 204, and 206.

As shown in FIG. 4B, the reproducer head unit 40 is constituted by reproducer heads 400, 402, 404, and 406. Each of the reproducer heads 400, 402, 404, and 406 is constituted by reproducer heads of a positive azimuth angle (positive azimuth reproducer heads) $a_{11}$, $a_{12}$ ($A_1$); $a_{21}$, $a_{22}$ ($A_2$); $a_{31}$, $a_{32}$, ($A_3$); and $a_{41}$, $a_{42}$ ($A_4$) arranged on the tape travelling surface of the rotation drum 30 at one helical track's worth of distance of the VTR tape 2 and reproducer heads of a negative azimuth angle (negative azimuth reproducer heads) $b_{11}$, $b_{12}$ ($B_1$); $b_{21}$, $b_{22}$ ($B_2$); $b_{31}$, $b_{32}$, ($B_3$); and $b_{41}$, $b_{42}$ ($B_4$) arranged at positions symmetrical to the positive azimuth reproducer heads of the tape travelling surface of the rotation drum 30 with respect to the axis of rotation of the rotation drum 30 at one helical track's worth of distance of the VTR tape 2 similar to the positive azimuth reproducer heads.

Below, the constituent parts of the VCR 1 will be explained.

The control unit 60 performs the control over the constituent parts of the VCR 1 such as control with respect to the capstans for matching the phases on the VTR tape 2 of the recording units of the video data (bottom data) which has been already recorded on the VTR tape 2 and the video data (top data) to be newly recorded on the VTR tape 2 based on the operation data input via an operation buttons provided in the VCR 1 or a terminal by the user etc. of the VCR 1 and the data input from the constituent parts of the VCR 1.

The tape travelling system 62 makes the VTR tape 2 run under the control of the control unit 60.

The drum rotation system 64 rotates the rotation drum 30 under the control of the control unit 60 and makes the recording head unit 20 and the reproducer head unit 40 arranged on the rotation drum 30 scan the helical tracks of the VTR tape 2.

Below, an explanation will be made of the constituent parts involved in the operation when recording the audio and/or video data on the VTR tape 2 by the VCR 1.

The recording unit 10 compresses and codes the noncompressed video data (INPUT VIDEO DATA) input from an external video processing apparatus by a compression and coding system such as the MPEG system and records the same together with the noncompressed audio signal (INPUT AUDIO DATA) on the VTR tape 2.

Figure 5:
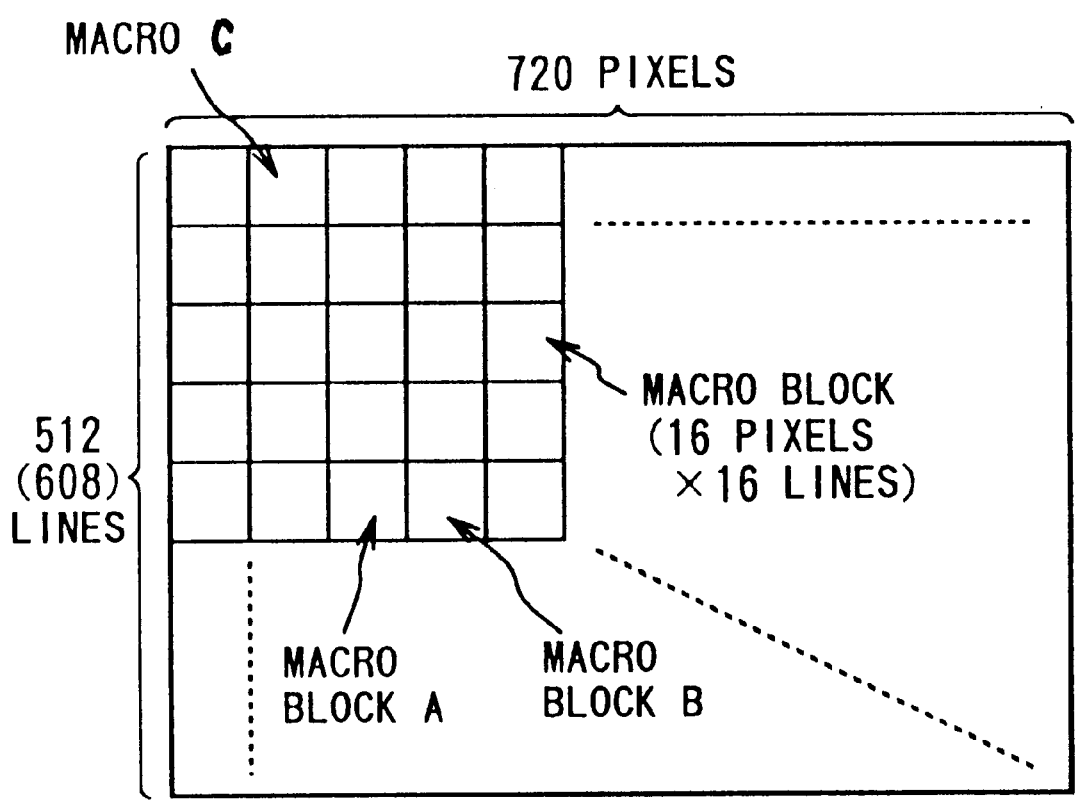
FIG. 5 is a view of the method of dividing the video data when a compression and coding system shown in FIG. 1 and FIG. 2 compresses and codes noncompressed video data.

FIG. 5 is a view of the method of division of the video data when compressing and coding the noncompressed video data by the compression and coding system 12 shown in FIG. 1 and FIG. 2.

As shown in FIG. 5, one screen contains 720 pixels in a scanning line direction, contains 512 lines in a vertical direction in the case of video data having a 525/60 configuration, and contains 608 lines in the vertical direction in the case of video data having a 625/50 configuration. Since one macroblock consists of 16 pixels×16 lines, one screen in divided into 45×32 macroblocks in the case of video data having a 525/60 configuration and is divided into 45×38 macroblocks in the case of video data having a 625/50 configuration.

In the recording unit 10 (FIG. 1), the compression and coding system 12 divides the input noncompressed video data into macroblocks of 16 pixels×16 lines as shown in FIG. 5 and performs discrete cosine transformation (DCT) or other orthogonal transformation, predictive coding, quantization, and variable length coding with respect to these macroblocks to compress and code the data in units of GOP's.

Figure 6A:
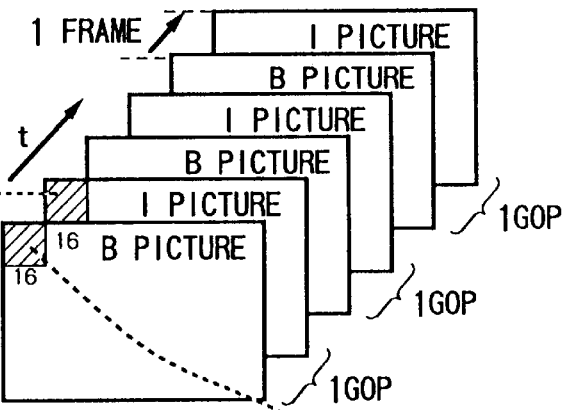
FIGS. 6A to 6C are views of the compressed video data output from the compression and coding system shown in FIG. 1 to the recording system.
Figure 6B:
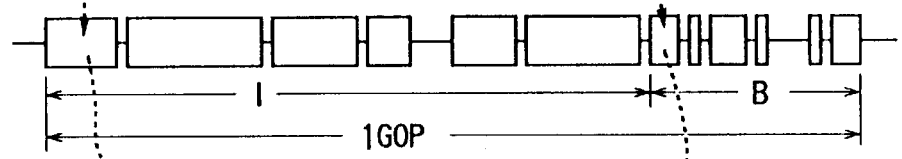
Figure 6C:
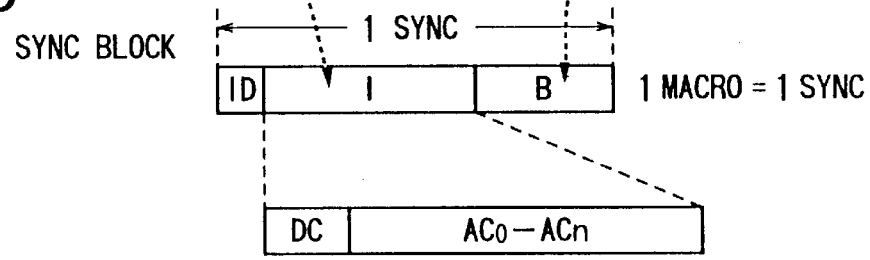

FIGS. 6A to 6C are views of the compressed video data output from the compression and coding system 12 to the recording system 14 shown in FIG. 1.

As shown in FIG. 6A, a GOP of the compressed video data contains for example two frames of compressed video data, that is, an I-frame (Intra Picture) of data which is compressed and coded completely within the frame and can be expanded and decoded without the use of the data of another frame and a B-frame (Bi-directional Picture) of data which is compressed and coded so as to have a correlation with the frames before and after it and in expanded and decoded by using the expanded and decoded data of the frames before and after this.

As shown in FIG. 6B, the compression and coding system 12 outputs the generated compressed video data as a bit train, comprised of the I-frames first and the B-frames requiring a relatively long processing time in the constituent parts after this following the same, to the pack circuit 140 of the recording system 14 (FIG. 2).

The recording system 14 (FIG. 1 and FIG. 2) shuffles the compressed video data by using the memory circuit 18, assembles the same to the predetermined recording format, adds the error correction codes (external code (OUTER ECC) and inner code (INNER ECC)—also referred to as the product codes together) having at least a capability for correcting error even if two helical tracks worth of the video data is lost, and records the result on the helical tracks of the VTR tape 2 via the recording head unit 20.

In the recording system 14, the pack circuit 140 performs processing based on the GOP data input from the compression and coding system 12, houses the video data compressed video data input from the compression and coding system 12, the noncompressed audio data, and the system auxiliary data input from the control unit 60 in units of recording blocks of fixed length shown in FIG. 6C and FIGS. 7A to 7D, and stores the same in the memory circuit 18 according to a write address generated by a write address control circuit 142. Further, the pack circuit 140 separates the macroblock position data (macroblock numbers) contained in the compressed video data and indicating the position (FIG. 5) on the screen of each of the macroblocks and outputs the same to the write address control circuit 142.

FIGS. 7A to 7D are views of the configuration of a recording block unit by which the recording system 14 shown in FIG. 2 multiplexes the compressed video data and noncompressed audio data.

As shown in FIG. 7A, the recording block unit has a 126-byte configuration. From the header, it includes a 2-byte synchronization data region SYNC, a 4-byte identification data region ID, a 108-byte data region (DATA), and a 12-byte inner code (INNER PARITY) region.

As shown in FIG. 7B, the 64 recording blocks for compressed video data (I-frames and B-frames) constitute one error correction code (ECC) block containing video data. The ECC block contains 50 recording block units obtained by multiplexing the compressed video data in the data region (DATA) and 14 recording block units containing the outer code (OUTER PARITY). Note that, where the compressed video data is of the 625/50 configuration, one GOP's worth of the video data is housed in 36 ECC blocks, and where the compressed video data if of the 525/60 configuration, one GOP's worth of the video data is housed in 30 ECC blocks.

Figure 7C:
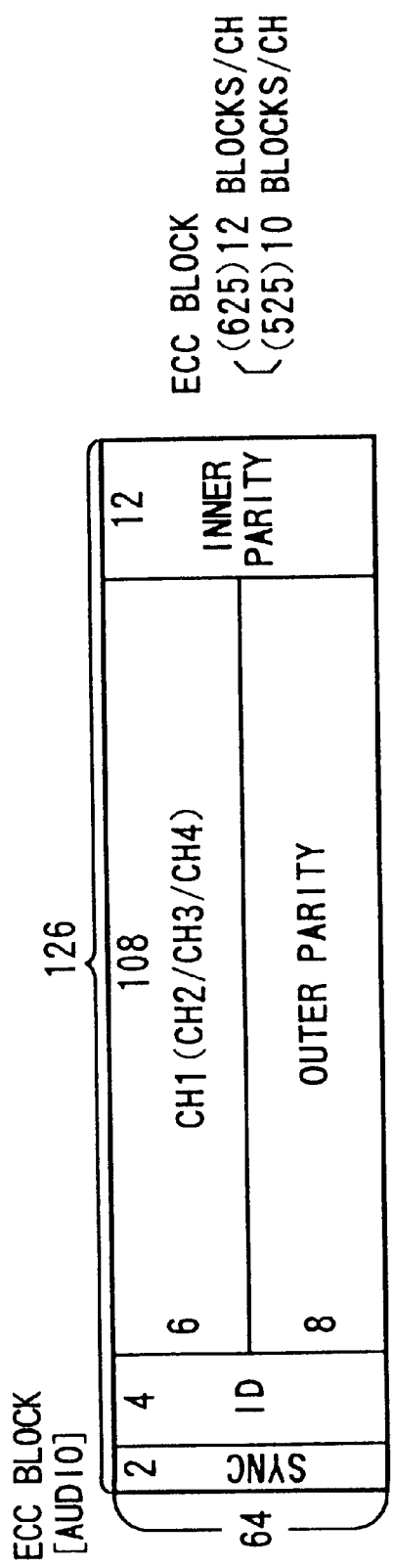

Further, as shown in FIG. 7C, the 14 recording blocks for the noncompressed audio data constitute one ECC block containing the noncompressed audio data. The ECC block contains six recording block units obtained by multiplexing the noncompressed audio data in the data region (DATA) and eight recording block units containing the outer code (OUTER PARITY).

Note that when the compressed video data is of the 625/50 configuration, one GOP's worth of one channel of the audio data is housed in 12 ECC blocks, while when the compressed video data is of the 525/60 configuration, one GOP's worth of one channel of the audio data is housed in 10 ECC blocks. Four channels (CH1 to CH4) of the audio data at a maximum are contained in one GOP. Note that, the noncompressed audio data has a fixed length. The pack circuit 140 equally divides the noncompressed audio data into fixed lengths of data and houses the same in the recording block units.

Figure 7D:
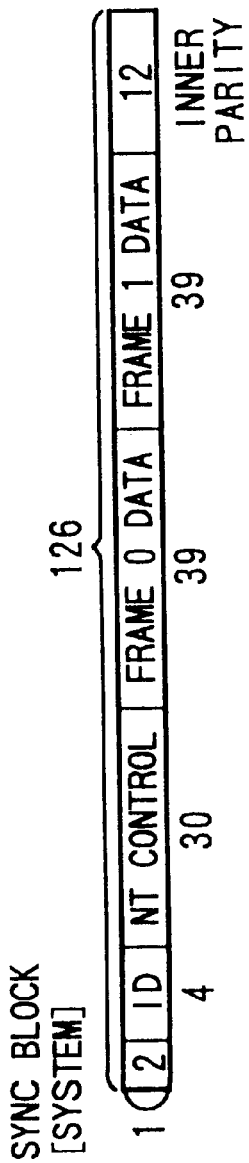

Further, as shown in FIG. 7D, the system auxiliary data generated by the control unit 60 etc. in added for every GOP's worth of audio and/or video data. The system auxiliary data houses in the data region (DATA) from the header the 30 bytes of nontracking control data (NT control) used at the nontracking processing (mentioned later) in the nontracking control circuit 512 of the reproduction system 50 and two frames worth of 39 bytes of management data (Frame 0 Data and Frame 1 Data) per frame, i.e., 78 bytes in total, used by the user for managing the VTR tape 2.

Note that the system auxiliary data, differs from the recording blocks for video data and the recording blocks for audio data in that it in not given an outer code and does not adopt the configuration of an ECC block. Instead, in order to ensure the reliability of the system auxiliary data, for every GOP of audio and/or video data worth of recording regions of the VTR tape 2, 32 sets of system auxiliary data are repeatedly written in the case where the compressed video data is of a 625/50 configuration and 24 sets of system auxiliary data are repeatedly written in the case where the compressed video data is of a 525/60 configuration.

Here, further, in contrast to the fact that the compressed video data has a variable length for every macroblock, the recording block units have a fixed length, therefore the exactly one macroblock's worth of the compressed video data is not always housed in one recording block unit and there is extra space in the recording block unit or one macroblock of the compressed video data cannot be completely housed in one recording block unit.

On the other hand, when a data error occurs in the middle of a recording block unit, the data after the part in that recording block where the data error occurs can no longer be reproduced in the expansion and decoding system.

Further, the quality of the image after reproduction is considerably affected by the DC component and low frequency component of each macroblock. For this reason, the pack circuit 140 houses the components of each macroblock of the compressed video data in the order from the lowest frequency from the header of the data region (DATA) of the ECC block shown in FIG. 7B.

When accommodating the components of the compressed video data in the data region (DATA) in the order from the lowest frequency up in this way and recording them on the VTR tape 2, so long as no data error occur in the header of the data-region of the recording block unit, at least the DC component of the compressed video data having the largest influence upon the quality of the reproduction image can be reproduced.

Accordingly, by accommodating the compressed video data in recording block units by this method, it is possible to substantially prevent a situation in which the image of a macroblock in which a data error occurs cannot be reproduced at all and to suppress to the maximum extent the deterioration of quality of the reproduced image. Further, if this method is adopted, a similar effect is obtained, that is, it becomes possible to reproduce a macroblock by using just the low frequency component, even in a case where it was not possible to read all of the data of a recording block unit due to the VCR 1 reproducing the audio and/or video data from the VTR tape 2 at a high speed.

Figure 8:
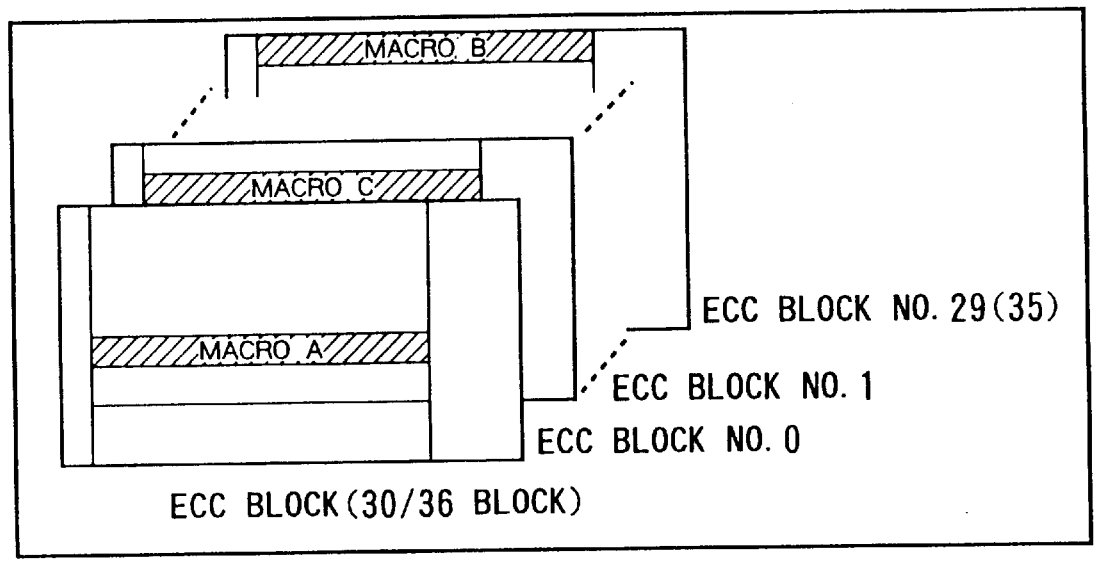
FIG. 8 is a view of an ECC block stored in a memory circuit shown in FIG. 1.

FIG. 8 is a view of an ECC block stored in the memory circuit 18 shown in FIG. 1.

Figure 9:
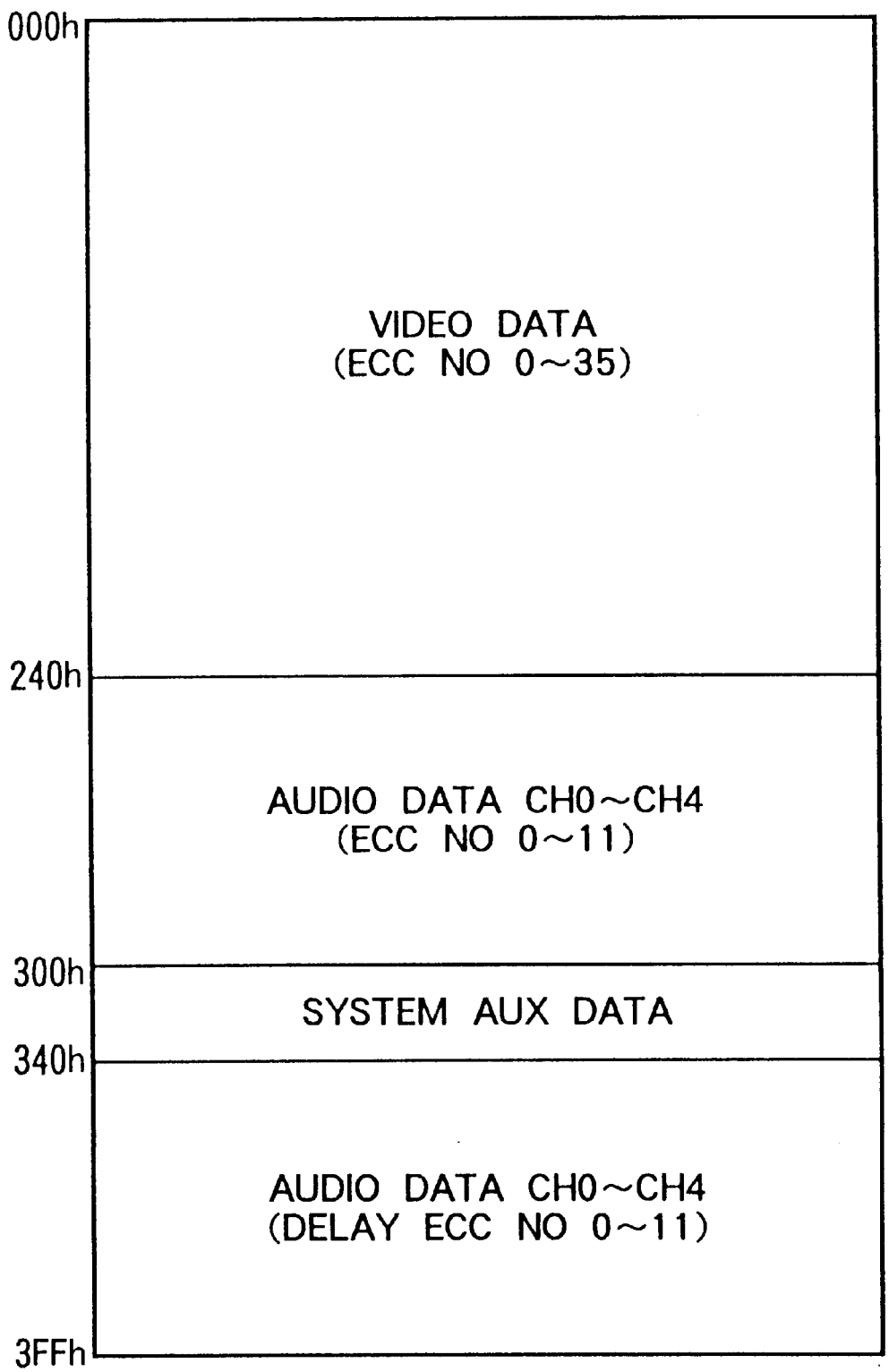
FIG. 9 is a view of a recording region of the memory circuit shown in FIG. 1.

FIG. 9 is a view of the recording region of the memory circuit 18 shown in FIG. 1.

The compressed video data housed by the recording system 14 in a recording block unit (FIG. 7) as mentioned above is stored in the memory circuit 18 as shown in FIG. 8 and FIG. 9.

In the memory circuit 18, the ECC block (FIG. 7B) for the video data is stored at the 000h address (h; hexa-decimal) to 240h address (2 bytes (16 bits) per address) of the memory circuit 18 an shown in for example FIG. 9.

Further, the ECC block (FIG. 7C) for the audio data is stored from for example the 240h address to 300h address of the memory circuit 18.

Further, the system auxiliary data (FIG. 7D) is stored from for example the 300h address to 340h address of the memory circuit 18.

Further, the 340h address to 3FFh address of the memory circuit 18 are used as the reserve region for the audio delay.

The shuffling ROM circuit 144 stores the address (shuffling pattern) of the memory circuit 18 corresponding to each of the recording block units to be recorded in the memory circuit 18 by the pack circuit 140 and outputs the same to the write address control circuit 142 under the control of the write address control circuit 142.

That is, the write address control circuit 142 generates a write address indicating which number of the recording block units of the ECC block a recording block unit output from the pack circuit 140 becomes according to the shuffling pattern input from the shuffling ROM circuit 144 and performs the shuffling with respect to the ECC block and the system auxiliary data (FIG. 7).

Note that, in the VCR 1, the size of the macroblock is a relatively large 16 pixels×16 lines, therefore, for example, whenever the recording head unit 20 scans the VTR tape 2 one time, a shuffling pattern for performing shuffling so that the macroblocks adjoining each other on a picture are simultaneously recorded on the VTR tape 2 together is stored in the shuffling ROM circuit 144.

That is, in the VCR 1, at the time of high speed reproduction, the compressed video data corresponding to a wide area of the screen is read from the VTR tape 2 at one time by one scan of the reproducer head unit 40, therefore the content of the screen can be easily confirmed.

Figure 10:
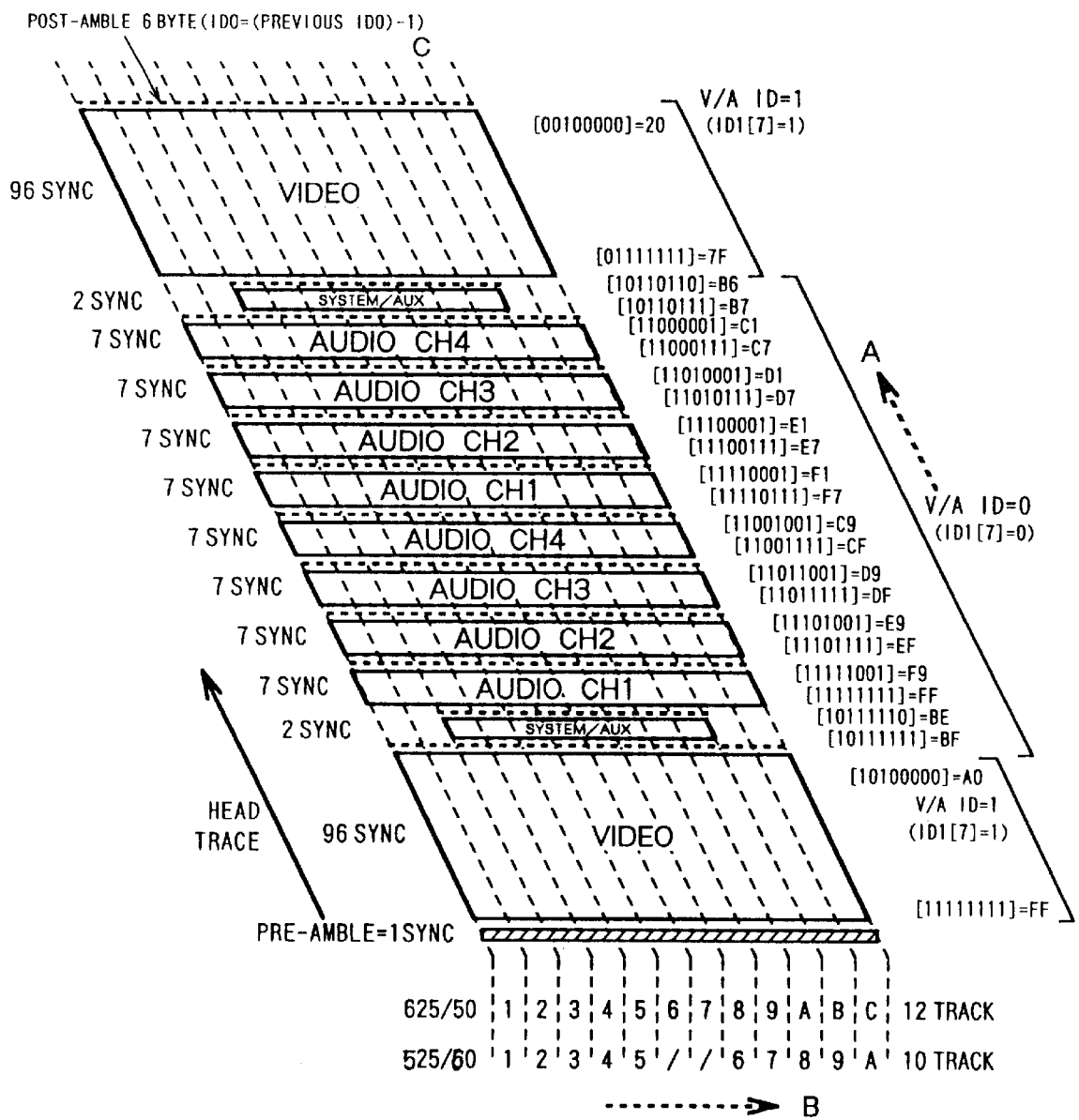
FIG. 10 is a view of a recording format of the video data, audio data, and system auxiliary data on a VTR tape shown in FIG. 1.

FIG. 10 is a view of the recording format of the video data, audio data, and system auxiliary data on the VTR tape 2 shown in FIG. 1.

Figure 11:
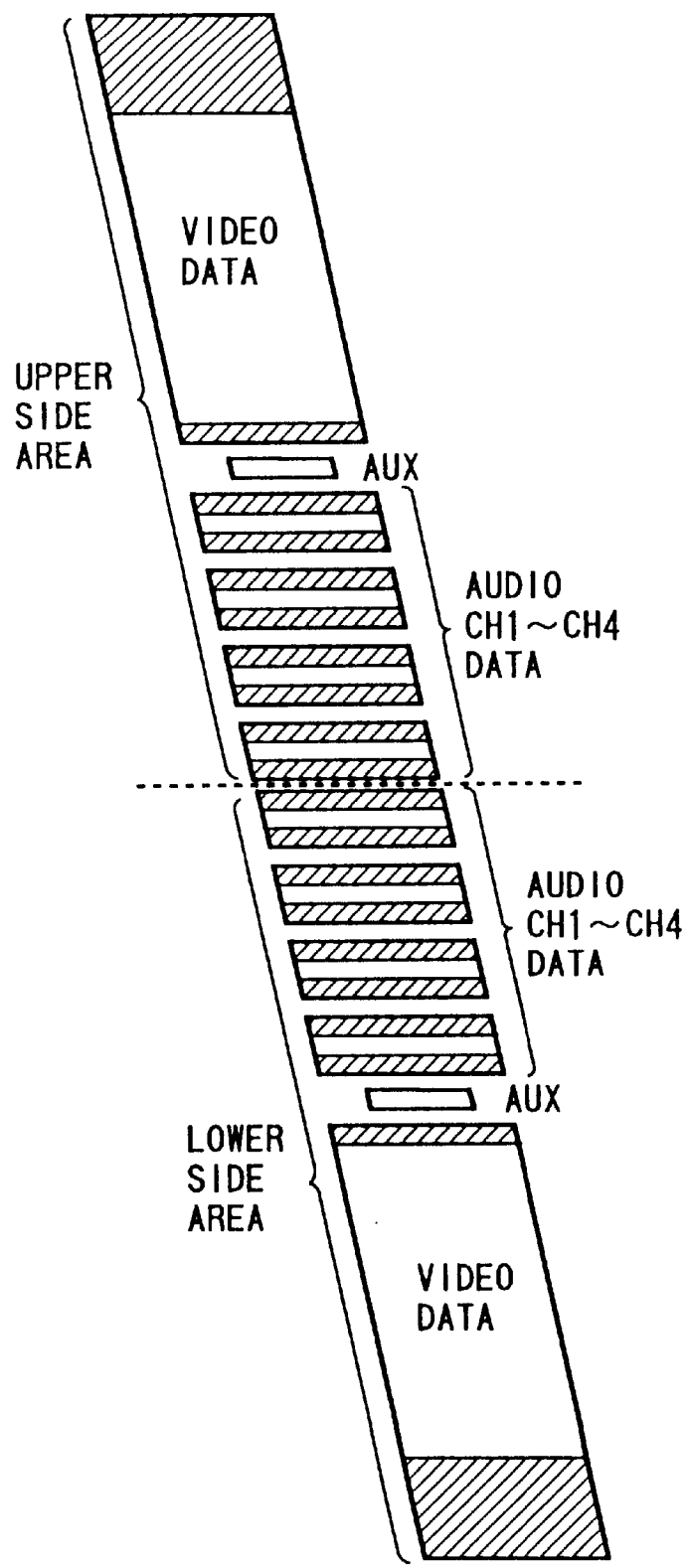
FIG. 11 is a view of the recording position on the VTR tape of the video data, audio data, and system auxiliary data shown in FIG. 10.

FIG. 11 is a view of the recording position of the video data, audio data, and system auxiliary data shown in FIG. 10 on the VTR tape 2.

As shown in FIG. 10, one GOP's worth of video data of the 525/60 configuration is recorded on 10 helical tracks of the VTR tape 2, while one GOP's worth of video data of the 625/50 configuration is recorded on 12 helical tracks of the VTR tape 2.

Further, as shown in FIG. 11, one GOP's worth of the audio and/or video data is divided into halves— one for the upper side area and one for the lower side area of a helical track of the VTR tape 2. The audio data is recorded at the center of the VTR tape 2, and the video data is recorded on the two sides of the audio data.

The outer code encoder 146 (FIG. 2) reads the audio and/or video data from the ECC block for the video data and the ECC block (FIG. 7) for the audio data recorded in the memory circuit 18 and generates the outer code from the compressed video data or audio data contained in each data region (DATA). Further, the outer code encoder 146 stores the generated outer codes together with the read audio and/or video data at addresses corresponding to the data region (DATA) and the outer code region of the memory circuit 18.

The SYNC ID adding circuit 152 is activated by the recording start signal (REC START) input from the control unit 60 and generates the synchronization data SYNC. Further, the SYNC ID adding circuit 152 generates the identification data ID and outputs the same to the read address control circuit 150.

Here, an explanation will be made of the identification data ID generated by the SYNC ID adding circuit 152.

Figure 12:
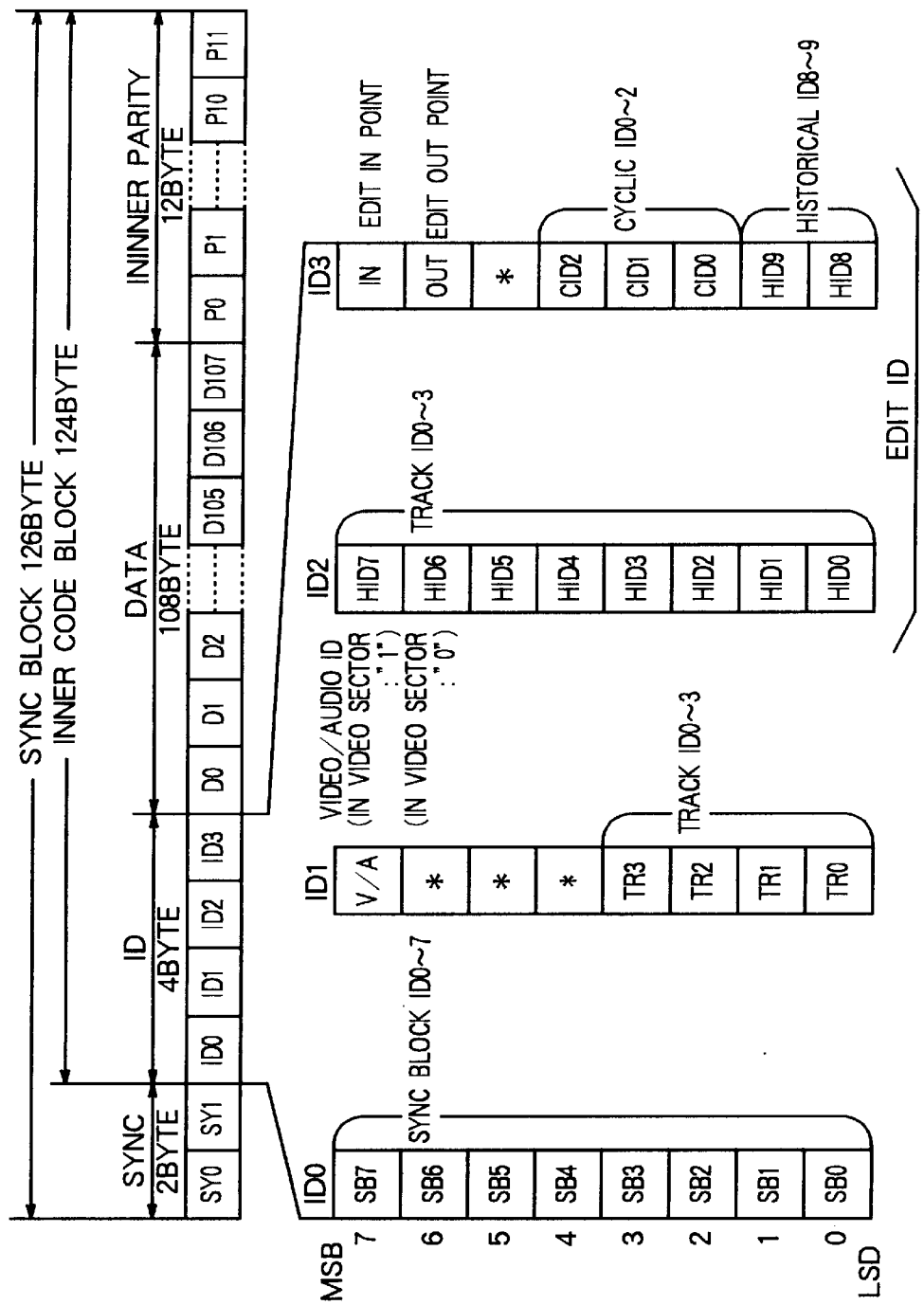
FIG. 12 is a view of the contents of the identification data ID shown in FIG. 9.

FIG. 12 is a view of the contents of the identification data ID shown in FIG. 7A.

As shown in FIG. 10, one GOP' worth of the ECC block and the system auxiliary data (SYSTEM AUX) recorded in the memory circuit 16 are recorded on 10 helical tracks of the VTR tape 2 in the case of video data of a 525/60 configuration and are recorded on 12 helical tracks of the VTR tape 2 in the case of video data of a 625/50 configuration.

The identification data ID contains the synchronization block (Sync Block) ID and track (Track) ID (below, also simply referred to an the identification data ID together).

Bach of the recording block units of the ECC block and system auxiliary data, as indicated by an arrow A in FIG. 10, is given an 8-bit synchronization block ID shown in FIG. 12. As indicated by an arrow B in FIG. 10, a track ID is added to audio and/or video data of the 625/50 format within the range from 01h to 0Ch and to audio and/or video data of the 525/60 format within the range from 01h to 0Ah.

The sixth bit of the synchronization block ID of the audio data use ECC block (FIG. 7C) is used for the identification of the system auxiliary data and the audio data, the fifth and fourth bits are used for the identification of the channels (CH1 to CH4) of the audio data, and the third bit is used for the identification of the upper side area and lower side area of the helical track.

Further, the seventh bit of the synchronization block ID of the video data use ECC block is used for the identification of the upper and lower areas of the sector.

Further, a historical ID (HISTORICAL ID), cyclic (CYCLIC ID), and start identification data (EDIT IN POINT) and end identification data (EDIT OUT POINT) are contained in the edit data ID (EDIT ID).

Among these data, the start identification data (EDIT IN POINT) is given a logical value "1" when the GOP of the video or audio data in unite of GOP's is the first GOP of the video or audio data and is given a logical value "0" in cases other than this.

Further, the end identification data is given a logical value "1" when the GOP of the video or audio data in units of GOP's is the last GOP of the video or audio data and is given a logical value "0" in cases other than this.

That is, when performing editing for connecting a plurality of sets of video (audio) data by referring to the start identification data (EDIT IN POINT) and the end identification data (EDIT OUT POINT), it can be judged whether one of the data of first GOP or last GOP of the bottom data and the top data is housed in the synchronization block at the boundary part (editing point) of the bottom data and the top data.

Data indicating the editing history of the synchronization block, for example, the data for eliminating the synchronization block missing part of the data at the editing point, is housed in the historical ID.

Data indicating the order of the GOP units of the synchronization block of the short period used for the nontracking processing mentioned later and taking cyclic values is housed in the cyclic ID.

The interleave ROM circuit 148 (FIG. 2) stores an interleave pattern indicating which number of the recording block units of the ECC block (FIGS. 7A to 7D) the identification data ID corresponds, reads the stored interleave pattern under the control of the read address control circuit 150, and outputs the same to the read address control circuit 150.

The read address control circuit 150 controls the interleave ROM circuit 148, reads the interleave pattern, and generates the read address of the memory circuit 18 in which the recording block unit corresponding to the input identification data ID is recorded based on the interleave pattern.

The memory circuit 18 outputs the recording block unit stored at the read address generated by the read address control circuit 150 to the SYNC ID adding circuit 152.

The SYNC ID adding circuit 152 is activated by the recording start signal (REC START) input from the control unit 60, generates the synchronization data SYNC identification data ID, adds the name to the input recording block unit, divides the same corresponding to the helical tracks of the VTR tape 2, performs the interleaving, and further performs a track replacement and outputs the same to the inner code encoder 154.

The inner code encoder circuit 154 generates the 12-bit inner code (FIGS. 7A to 7D) from the audio and/or video data and system auxiliary data input from the SYNC ID adding circuit 152, adds the generated inner code to the audio, video, and system auxiliary data as shown in FIGS. 7A to 7D, and outputs the same to the recording head unit 20. Note that, as mentioned above, the error correction code added by the outer code encoder 146 and the inner code encoder 154 has an error correction capability enabling correction of error even if two helical tracks worth of the video data is lost per GOP.

The recording head unit 20 records the audio, video, and system auxiliary data input from the inner code encoder circuit 154 on the helical tracks of the VTR tape 2.

Below, an explanation will be made of the constituent parts involved in the operation when the VCR 1 reproduces the audio and/or video data from the VTR tape 2.

Each of the reproducer heads 400, 402, 404, and 406 (FIG. 4B) of the reproducer head unit 40 scans the helical tracks of the VTR tape 2, reproduces the audio and/or video data and system auxiliary data ((PB DATA) FIG. 3; below, also simply referred to as the audio and/or video data), and outputs the same to the inner code decoder circuit 500.

In the reproduction system 50 (FIG. 1 and FIG. 3) of the reproduction unit 48, the inner code decoder circuit 500 detects the data error by using the inner code contained in each synchronization block (FIG. 7A) of the audio and/or video data input from each of the reproducer heads 400, 402, 404, and 406 and corrects the data error.

The ID detection circuit 510 separates the identification data ID (FIG. 10 and FIG. 12) from the synchronization block of the audio, video, and system auxiliary data input from the inner code decoder circuit 500, outputs this to the write address control circuit 514 and the control unit 60, and outputs the audio, video, and system auxiliary data to the nontracking control circuit 512.

The nontracking control circuit 512 performs the nontracking control by using the system auxiliary data. That is, the nontracking control circuit 512 stores the audio and/or video data without data error detected at the inner code decoder circuit 500 among the audio and/or video data reproduced by the reproducer heads 400, 402, 404, and 406 in the memory circuit 560 with priority. Further, at this time, the memory circuit 560 is controlled so that the audio and/or video data composing the same GOP are positioned together in the same memory by utilizing the cyclic ID's having the same values in units of GOP's.

Here, an explanation will be made of the nontracking control.

On the VTR tape 2, the audio and/or video data are recorded by alternately inverting the azimuth angles of the adjoining helical tracks. When the azimuth angles are alternately inverted for every helical track in this way, if helical tracks having different azimuth angles are traced by the reproducer heads 400, 402. 404, and 406 of the reproducer head unit 40, the recorded audio and/or video data cannot be reproduced.

Further, even in a case where one or more of the reproducer heads 400, 402, 404, and 406 trace helical tracks having same azimuth angle, if the helical tracks are not correctly traced, a large number of errors will occur in the reproduced audio and/or video data.

Nontracking control makes positive use of this property of the reproduction heads and the azimuth angle of the helical tracks at the time of the reproduction of the audio and/or video data. That is, as shown in FIG. 4B, the reproducer heads 400, 402, 404, and 406 include two positive azimuth heads and two negative azimuth heads at one helical track's worth of distance. The audio and/or video data read by the reproducer head having an azimuth angle which matches with the helical track and correctly tracing the helical track among the four reproducer heads 400, 402, 404, and 406, that is, the audio and/or video data having the smallest data error, is selected and output. By adopting the nontracking system, the conditions for the control of the tracking of the helical tracks of the VCR 1 by the reproducer heads are greatly relieved.

The de-interleaving ROM circuit 516 corresponds to the interleave ROM circuit 148 of the recording unit 10, stores a de-interleaving pattern for returning the arrangement of the audio and/or video data interleaved by the read address control 150 (FIG. 2) to the arrangement before the interleave, and sequentially outputs the stored interleave patterns to the write address control circuit 514 under the control of the write address control circuit 514.

The write address control circuit 514 controls the de-interleaving ROM circuit 516 according to the identification data ID separated by the ID detection circuit 510 to read the de-interleaving pattern, generates the write address of the audio and/or video data to be output by the nontracking control circuit 512 based an the read de-interleaving pattern, and makes the memory circuit 560 store the audio and/or video data output from the nontracking control circuit 512. The write address control circuit 514 performs the de-interleaving processing on the audio and/or video data interleaved by the read address control circuit 150 of the recording unit 10 and returns the arrangement of same to that before the interleave by this method.

The audio and/or video data output from the nontracking control circuit 512 is stored at the addresses of the memory circuit 560 generated by the write address control circuit 154 and returned to the same arrangement as the ECC blocks (FIGS. 7A to 7D) of the audio and/or video data in the memory. By also rearranging the audio and/or video data subjected to the track replacement based on the identification data ID inserted at the time of the recording in this way, it can be returned to the original arrangement by exactly the same processing as that for the audio and/or video data not subjected to the track replacement.

Further, the nontracking control circuit 512 arranges the ECC blocks returned to the original arrangement to an arrangement suited to error correction using the outer code in the outer code decoder circuit 518.

Second Embodiment

It is sometimes desired to use the VCR 1 shown in the first embodiment for work for continuously connecting several scenes of video data which have been shot to produce video data of a movie, that is, editing. However, when different scenes of the video data have been recorded on VTR tape by using different VCR's, there will sometimes be error (track deviation) in the recording positions of the different scenes of the video data on the VTR tape due to the differences of mechanical precision of the tape travelling system and the drum rotation system between the VCR's. Since the VCR 1 reproduces a plurality of sets of video data between which there is track deviation in this way and, further, performs nontracking reproduction to ease the required mechanical precision, the track deviation at the time of recording becomes large.

Further, when using the VCR1 to record the data on the VTR tape 2 after performing the editing, there is a possibility that, at the boundary (editing point) of the video data (bottom data) which has been already recorded on the VTR tape 2 and the video data (top data) to be newly recorded on the VTR tape 2 in an overlapping manner, the boundary of the GOP of the bottom data and the boundary of the GOP of the top data will not precisely match and that the recording of the top data will lead to a loss of part of the bottom data and a reduction in the quality of the video reproduced from near the editing point of the VTR tape 2.

In order to deal with this problem, consideration may be given to the method of increasing the redundancy of the video data to be recorded on the VTR tape 2 so as to prevent the reduction of quality of the video near the editing point by, that is, the method of adding an error correction code having a higher error correction capability to the audio and/or video data and then recording the same on the VTR tape 2. When this method is adopted, however, it is necessary to add an error correction code capable of performing error correction to the audio and/or video data even in a case where a number of tracks of data have been lost. For this reason, there is the problem that the recording density is lowered, the recordable time of the audio and/or video data with respect to the VTR tape by the VCR becomes short, etc.

Further, consideration can be given to the method of improving the mechanical precision of the tape travelling system and drum rotation system of the VCR, but this would make the VCR become more expensive and thus would not be practical. Further, this would run counter to the whole idea of using the nontracking system, the object on the invention, so as to ease the requirements on mechanical precision and reduce the price of the VCR.

Taking such a circumstance into account, in the second embodiment, the explanation will be made of an improved version of the VCR 1 shown in the first embodiment, that is a nontracking system VCR 3 which can perform editing work and in addition does not lower the quality of the video reproduced from near the editing point of the VTR tape 2 even if mechanical parts having a high precision are not used for the tape travelling system and the drum rotation system, etc.

Figure 13:
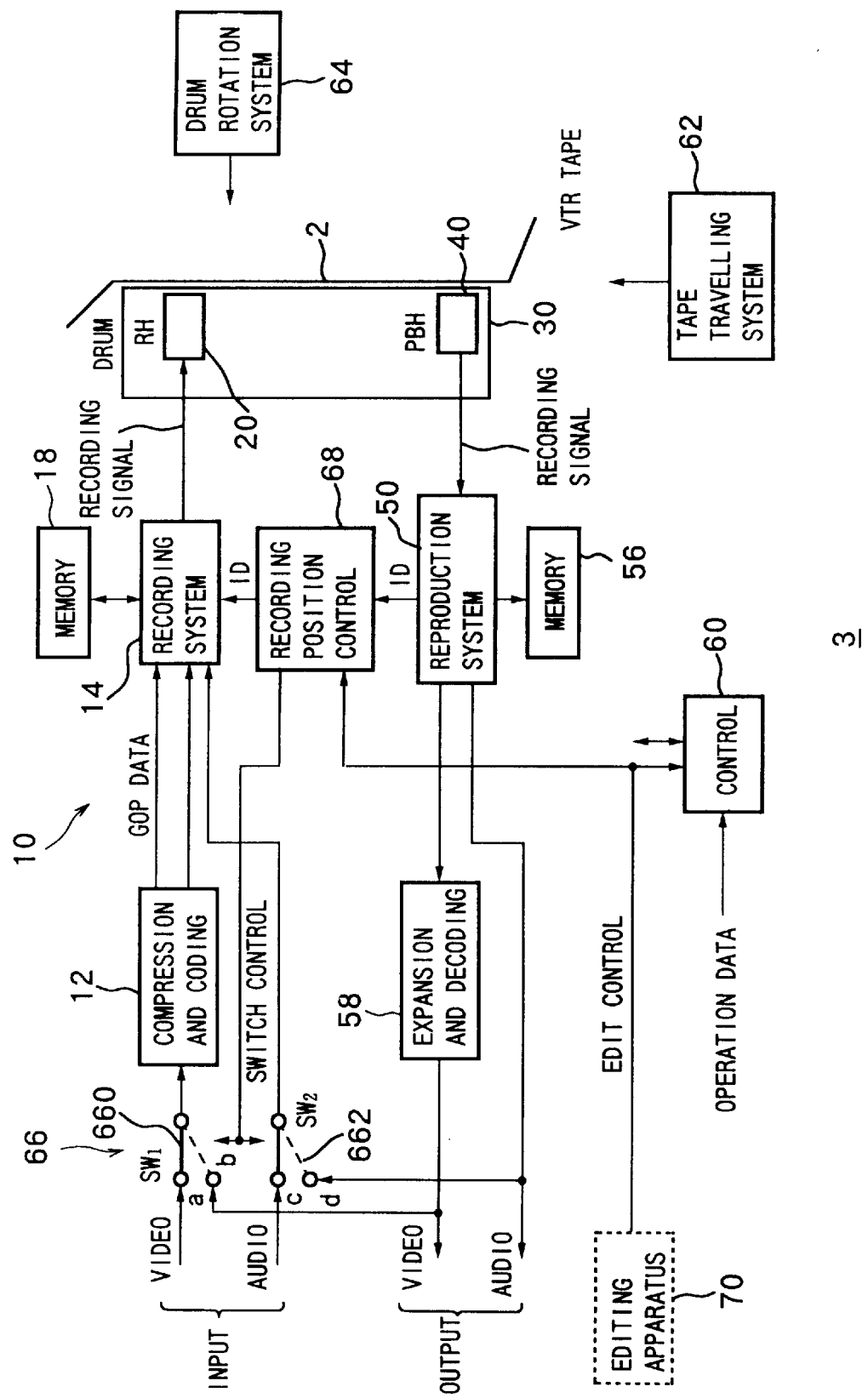
FIG. 13 is a view of the configuration of a VCR according to a second embodiment of the present invention.

FIG. 13 in a view of the configuration of the VCR 3 according to the second embodiment of the present invention. Note that, in FIG. 13, the same reference numerals are given to the constituent parts of the VCR 3 the same as the constituent parts of the VCR 1 (FIG. 1) shown in the first embodiment.

As shown in FIG. 13, the VCR 3 is configured as the VCR 1 plus an input data switching unit 66 and a recording position control unit 68. The input data switching unit 66 is constituted by a first switch (SW$_1$) 660 and a second switch (SW$_2$) 662.

Figure 14:
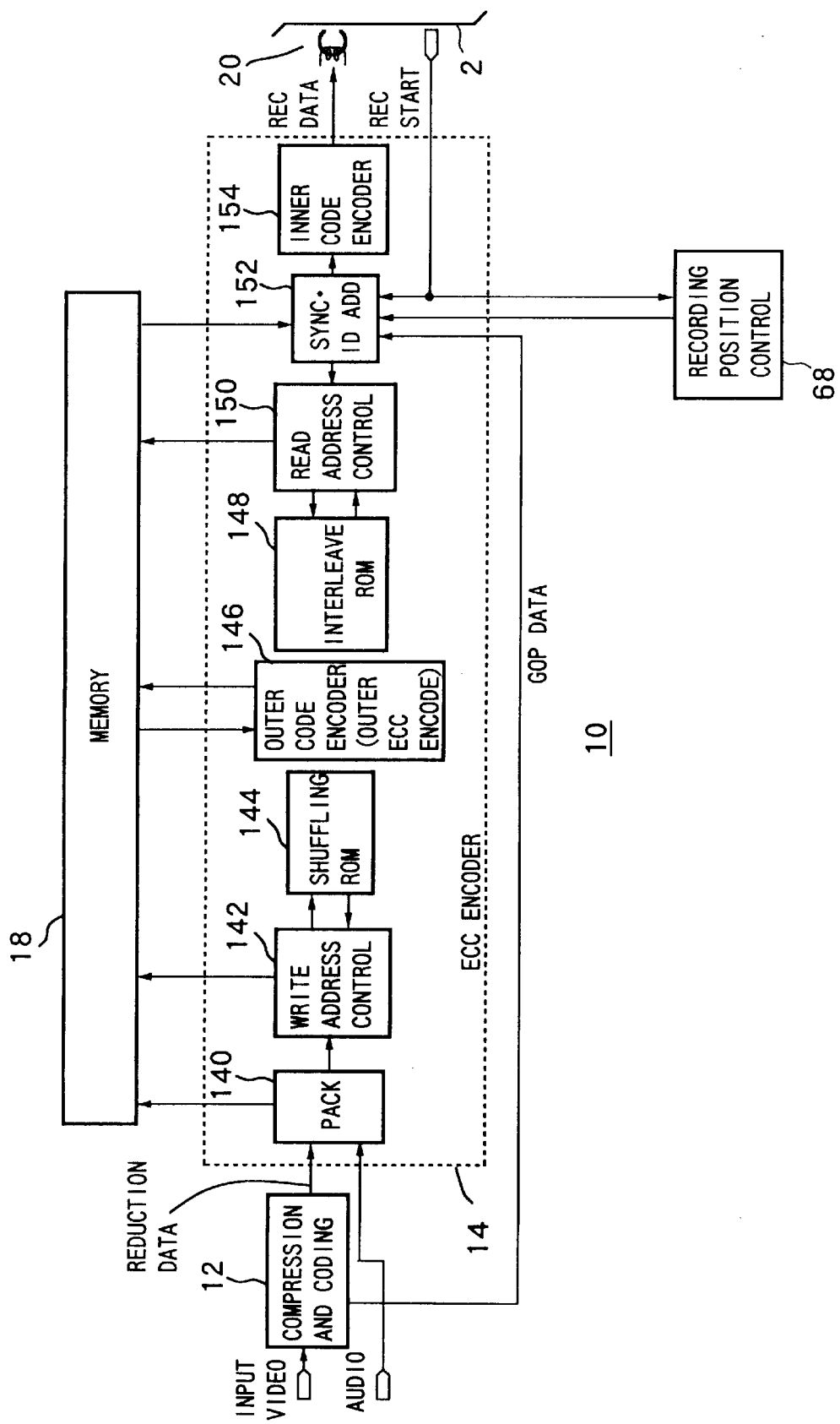
FIG. 14 is a view of the connection of the recording unit and a recording position control unit shown in FIG. 13.

FIG. 14 is a view of the connections of the recording unit 10 and the recording position control unit 68 shown in FIG. 13.

Figure 15:
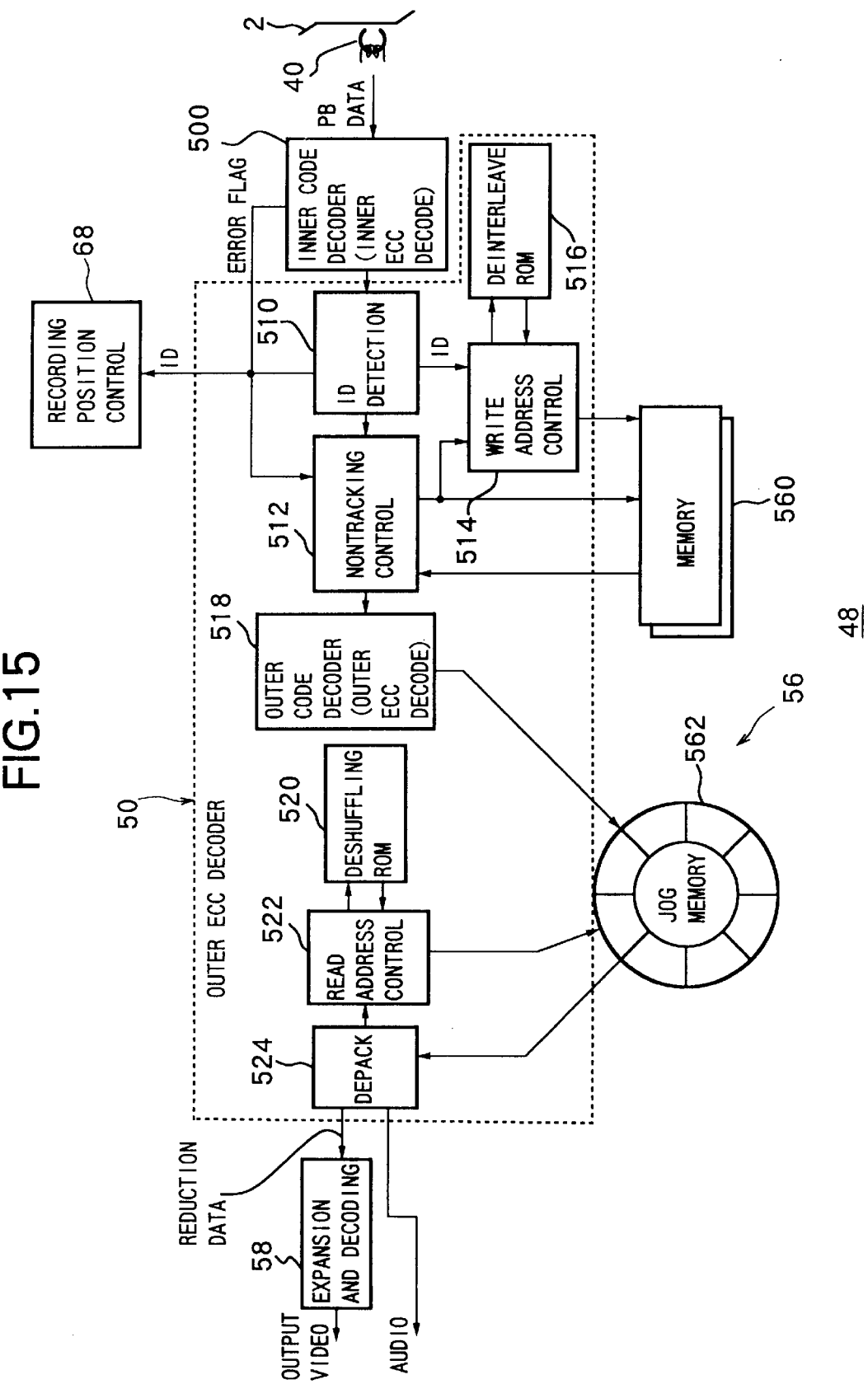
FIG. 15 is a view of the connection of the reproducing unit and the recording position control unit shown in FIG. 13.

FIG. 15 is a view of the connections of the reproduction unit 48 and the recording position control unit 68 shown in FIG. 13.

As shown in FIG. 14 and FIG. 15, the recording position control unit 68 receives the edit ID (FIG. 12; EDIT ID) and the recording start signal (REC START) detected by the ID detection circuit 510 of the reproduction unit 48 and the edit control data from an external editing apparatus 70 connected to the VCR 3, performs the processing based on the start identification data (EDIT IN POINT) and end identification data (RDIT OUT POINT) (hereinafter, also referred to collectively as the editing point data) contained in the edit ID, outputs the edit ID to be added to the synchronization block (FIGS. 7A to 7D) with respect to the SYNC ID adding circuit 152 of the recording unit 10, and controls the connection of the switches 660 and 662 of the input data switching unit 66.

Below, an explanation will be made of the operation of the VCR 3 when recording the top data on the bottom data in an overlapping manner.

The editing apparatus 70 inputs the edit control signal for indicating the recording start point (In Point) or the recording end point (Out Point) to the recording position control unit 68 and the control unit 60.

The control unit 60 controls the recording unit 10 to start the recording of the audio and/or video data based on the edit control data from the editing apparatus 70, operation data, and the data input from the constituent parts of the VCR 3, controls the reproduction unit 48 to start the reproduction of the bottom data, and further outputs the edit start signal (REC ON) to the recording system 14.

The reproduction unit 48 sequentially reproduces the synchronization blocks accommodating the bottom data which has been already recorded on the VTR tape 2 preceding the recording of the top data on the VTR tape 2 by the recording unit 10.

The ID detection circuit 510 of the reproduction unit 48 separates the start identification data (EDIT IN POINT) and end identification data (EDIT OUT POINT) contained in the edit ID from the synchronization blocks accommodating the reproduced bottom data and outputs the same to the recording position control unit 68.

The expansion and decoding system 58 expands and decodes the compressed video data input from the reproduction unit 48 and outputs the same to the input data switching unit 66 and the outside.

The compression and coding system 12 (FIG. 14) compresses and codes the noncompressed video data input from the outside and generates compressed video data (FIGS. 6A to 6C) comprised of GOP's comprised by two frames.

In the recording system 14 (FIG. 13), the pack circuit 140 (FIG. 14) houses the compressed video data and the noncompressed audio data in the recording blocks (FIG. 6C) and stores them in the memory circuit 18.

The outer code encoder 146 generates the outer code for the audio and/or video data contained in the ECC blocks (FIGS. 7A to 7D) and adds the same.

Here, the operation of the recording position control unit 68, that is, the control for changing the recording position by the recording position control unit 68 and the switch control with respect to the input data switching unit 66 will be concretely explained by referring to FIGS. 16A to 16D to FIGS. 20A to 20D.

FIGS. 16A to 16D and FIGS. 16A to 16D to FIGS. 20A to 20D are views of the control for changing the position for recording the top data on the VTR tape 2 by the recording position control unit 68 (FIG. 13 to FIG. 15) of the VCR 3 and the switch control with respect to the input data switching unit 66, respectively. The A to D parts of these figures show the positional relationships between the start position and the end position of the top data and bottom data. In each of the A to D parts of these figures, the small letters "a" denote a recording pattern (off tape pattern) of the VTR tape 2 before the recording of the top data, "b" denote waveforms of a switch control signal (picture SW'G) and recording start signal (REC ON) output from the recording position control unit 68 to the input data switching unit 66, and "c", denote the recording pattern (after editing) of the VTR tape 2 after recording (editing).

Figure 17A:
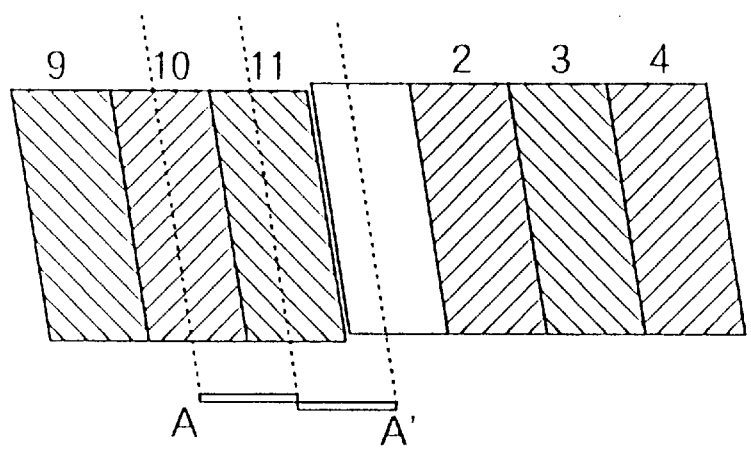
FIG. 17A shows the erasing of data on a helical track of a VTR tape at the recording start point.
Figure 17B:
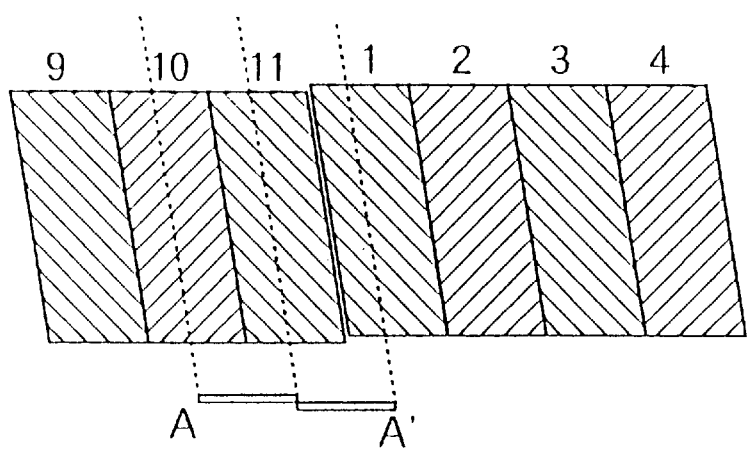
FIG. 17B is a view exemplifying the track deviation caused on the VTR tape.

FIGS. 17A to 17B are views exemplifying the erasing of data from the helical track of the VTR tape 2 at the starting part of the recording due to editing and the track deviation caused in the VTR tape 2, respectively.

Below, an explanation will be made of the processing of the control unit 60 and the recording position control unit 68 when editing a plurality of figures, that is, the newly setting a recording start position near a GOP already having a recording start position information in the bottom data by referring to FIGS. 16A to 16D.

First, an explanation will be made of a case where the start identification data of the synchronization block of the bottom data of the GOP next to the position (New In Point) of indication of the start of recording of the new top data by the editing apparatus 70 has the logical value "1", that is, the recording start position of the top data is recorded from the position one GOP preceding the recording start GOP of the bottom data by referring to FIGS. 16A to 16D.

Figure 16A:
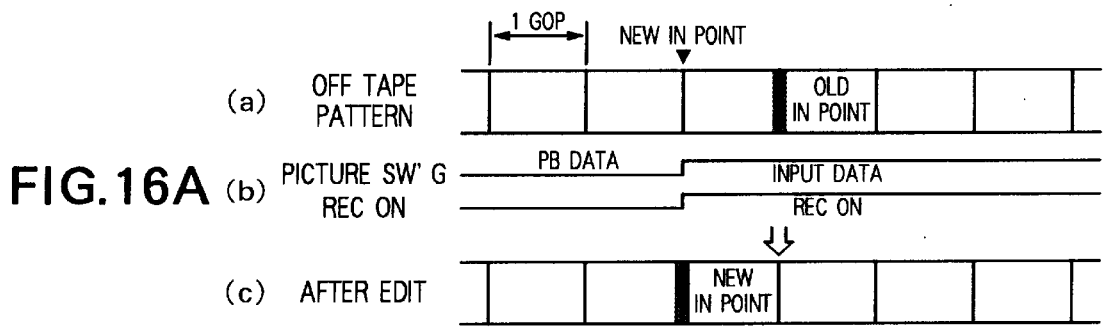
FIGS. 16A to 16D are views of the processing of a control unit 60 and a recording position control unit 68 where the recording start position of the top data is near a recording start GOP of the bottom data.

In the case shown in FIG. 16A, the recording of the new top data by the editing is started from before the recording start position already existing in the bottom data, therefore the loss of the data (EDIT DAMAGE) caused in the header part of the recording start GOP of the bottom data is solved by the recording of the top data, and the edit damage occurs in the header part of the recording start GOP of the top data. That is, by just shifting the edit damage to the front by the amount of one GOP, no particular problem occurs with the recording of the top data. Accordingly, the recording position control unit 68 controls the switches 660 and 662 of the input data switching unit 66 to respectively select the input terminals "a" and "c" from the new recording start point and simultaneously starts the recording of the tape. Accordingly, the switching timing of the input data switching unit 66 and the timing for actually starting the recording on the tape coincide as indicated by "b" of FIG. 16A, thus it in not necessary to change the recording start position.

However, as shown in FIG. 17B, where there is exactly one helical track's worth of track deviation in the top data and the first track of the top data is recorded immediately after the 11th track (in the case of the 625/50 format) of the bottom data, that is, where the last 12th track of the bottom data is overwritten, helical tracks having the same azimuth angle end up adjoining each other and it becomes impossible to reproduce the audio and/or video data from either of the first track of the bottom and the first track of the top data, two helical tracks worth of the audio and/or video data, that is, the 11th track and the 12th track, are lost from the last GOP of the bottom data, thus three helical tracks worth of data in total are lost together with the first track of the top data. It is not desirable to substantially lose three tracks worth of data in spite of the fact that there is one track of track deviation.

For this reason, the control unit 60 controls the recording system 14 and erases the first track of the first GOP of the top data as shown in FIG. 17A. By erasing the first track of the first GOP of the top data in this way, it is possible to keep the loss of the audio and/or video data of the last GOP of the bottom data and the first GOP of the top data to the amount of one track not—which does not exceed the error correction capability by the product code.

Next, an explanation will be made of a case where the start identification data of the synchronization block of the bottom data of the GOP exactly the same in position as the position (Now In Point) at which the start of recording of new top data is indicated by the editing apparatus 70 has the logical value "1", that is, the recording start position of the top data is recorded from the recording start position of the bottom data, by referring to FIG. 16B.

In such a case, the edit damage caused in the header of the recording start GOP already existing in the bottom data and the edit damage caused in the header of the recording start GOP of the new top data are merely superimposed on each other. By performing suitable processing by using the historical ID (FIG. 12) of the edit ID, it is possible to eliminate the excess remaining unerased bottom data which in not erased due to the track deviation, remains on the VTR tape 2, and would be reproduced together with the top data. Accordingly, the recording position control unit 68 controls the switches 660 and 662 of the input data switching unit 66 to respectively select the input terminals "a" and "c" from the new recording start point and simultaneously starts the recording of the tape. Accordingly, the switching timing of the input data switching unit 66 and the timing for actually starting the recording on the tape coincide as indicated by "b" of FIG. 16B, thus there is no need to change the recording start position.

Further, even if the last two helical tracks worth of the last GOP of the bottom data end up being erased due to track deviation when recording the top data, as mentioned above, the recording system 14 adds a product code capable of performing error correction even if two helical tracks of audio and/or video data are lost per ECC block, therefore it is possible to restore the lost data.

Next, an explanation will be made of the operation of the recording position control unit 60 where the start identification data of the synchronization block of the bottom data of the GOP immediately before the position (New In Point) at which the start of recording of new top data was indicated by the editing apparatus 70 has the logical value "1", that is, the recording start position of the top data is recorded from the position immediately after the recording start GOP of the bottom data, by referring to FIG. 16C.

Figure 16B:
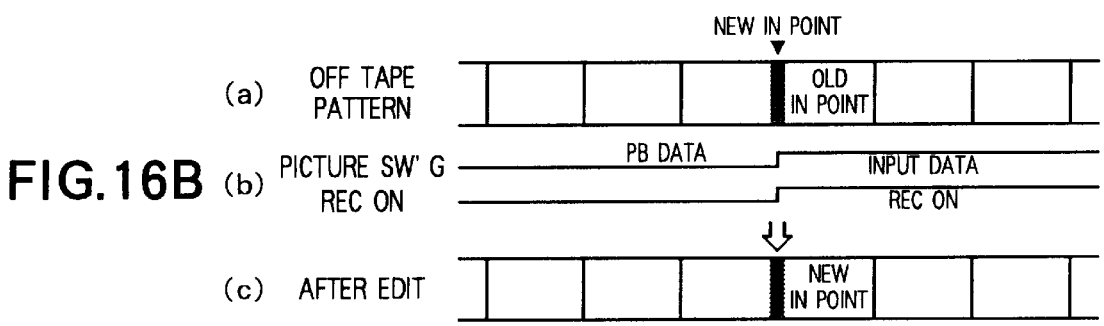
Figure 16C:
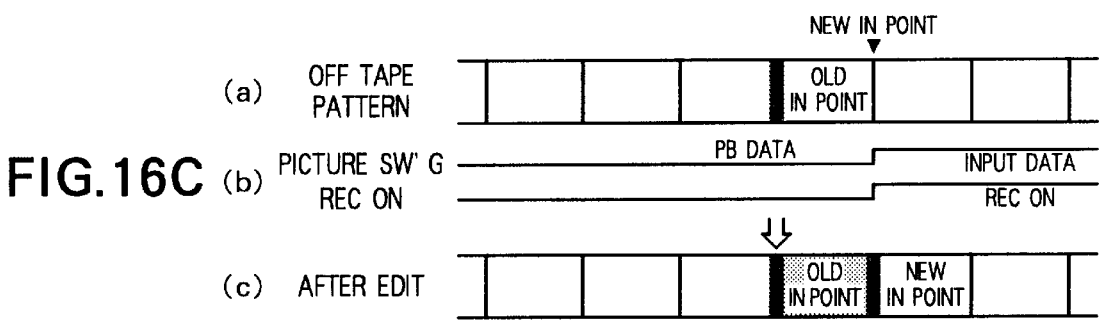

In the case shown in FIG. 16C, there is a possibility that as much as two helical tracks worth of the tail portion of the audio and/or video data at the already existing recording start GOP (Old In Point) of the bottom data may be overwritten by the top data due to the track deviation caused by a new editing point and lost.

Further, as shown in FIG. 17A, since only the first track of the already existing recording start GOP (Old In Point)

was erased in the past editing work, three helical tracks worth of the audio and/or video data end up being lost together with the overwriting of two tracks due to the new editing point in the forward direction—which exceeds the error correction capability of the product code to be added by the recording system 14.

Figure 16D:
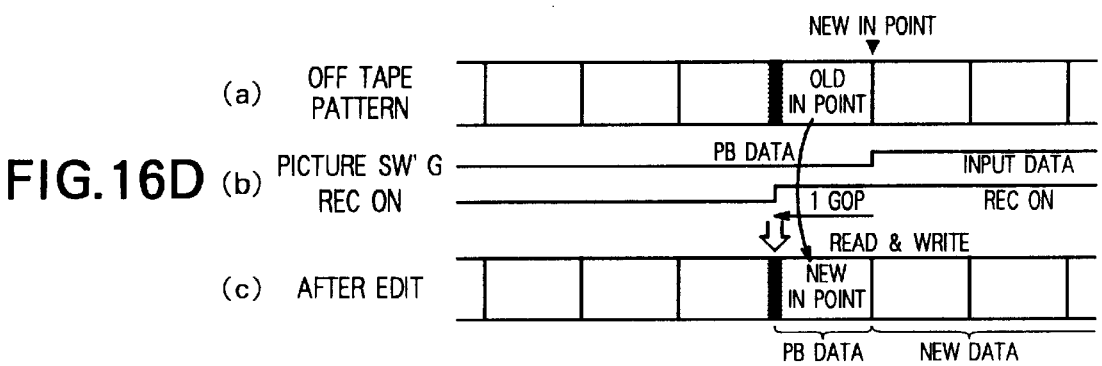

Therefore, in the case as shown in FIG. 16C, as shown in FIG. 16D, the position for starting the recording of the top data is made earlier by exactly the amount of one GOP so as to reduce the loss of the data caused in the last GOP of the bottom data to the amount of two helical tracks under the same conditions as those shown in FIG. 16B to thereby suppress the error to within the range of the error correction capability of the product code. Further, the bottom data which the reproduction unit 48 reproduced in advance by the reproducer head arranged on the drum preceding the recording head is overwritten on the last GOP (position on the same tape which was reproduced in advance) of the bottom data, thereby to substantially prevent the forward deviation of the recording start position of the top data and hold the timing of the start of recording of the top data.

In order to realize such a change of the recording position, the control unit 60 activates the recording start signal (REC ON) so as to perform the recording by overwriting on the last GOP of the bottom data and controls the timing for starting the recording by the recording system 14.

Further, the recording position control unit 68 performs control so that the switches 660 and 662 of the input data switching unit 66 respectively select the input terminals "b" and "d" based on the editing point data detected by the ID detection circuit 510 of the reproduction system 50 and so that the noncompressed audio data obtained by having the video data expanded and decoded by the expansion and decoding system 58 again compressed and coded by the recording unit 10 and then reproduced is overwritten on the last GOP of the bottom data, and further outputs the edit ID for respectively making the logical values of the start identification data and the end identification data of the synchronization block overwritten on the last GOP of the bottom data "1" and "0" to the SYNC ID adding circuit 152 of the recording system 14.

Below, an explanation will be made of the operation of the control unit 60 and the recording position control unit 68 when editing a plurality of times, that is, when newly setting the recording start position near a GOP already having recording end position information in the bottom data, by referring to FIGS. 18A to 18D.

First, an explanation will be made of the operation of the recording position control unit 68 where the end identification data of the synchronization block of the bottom data of a GOP exactly the same in position as the position (New In Point) at which the start of recording of new top data was indicated by the editing apparatus 70 has the logical value "1", that in, the recording start position of the top data is recorded from the recording end GOP of the bottom data, by referring to FIG. 18A.

Figure 18A:
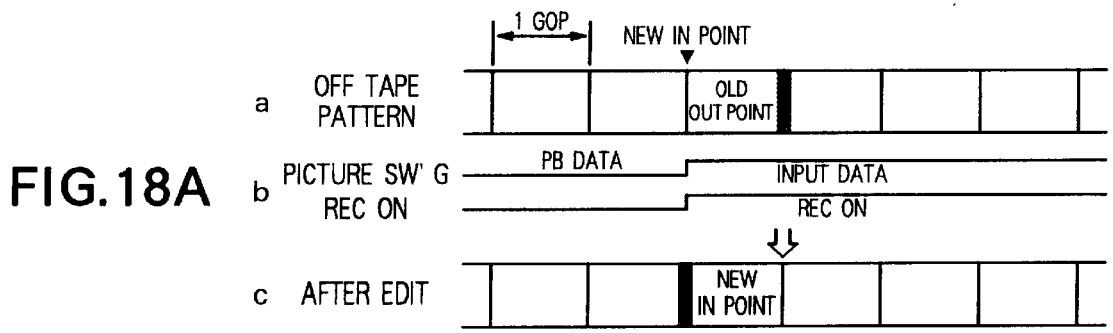
FIGS. 18A to 18D are views of the processing of the control unit and the recording position control unit where the recording start position of the top data is near a recording end GOP of the bottom data.

In the case shown in FIG. 18A, the edit damage produced in the tail part of the recording end GOP of the bottom data is repaired by the recording of new top data, and edit damage is produced in the header part of the recording start GOP of the top data. That is, the edit damage is just shifted to the front by one GOP. No particular problem occurs in the recording of the top damage. Accordingly, the recording position control unit 68 performs control so that the switches 660 and 662 of the input data switching unit 66 respectively select the input terminals "a" and "c" from the new recording start point and simultaneously actually starts the recording on the tape. Accordingly, the switch timing of the input data switching unit 66 and the timing for actually starting the recording on the tape coincide as indicated by "b" of FIG. 18A and no particular change is made in the recording position.

Next, an explanation will be made of the operation of the recording position control unit 68 where the end identification data of the synchronization block of the bottom data of the GOP immediately before the position (New In Point) at which the start of recording of new top data was indicated by the editing apparatus 70 has the logical value "1", that is, the first recording start position of the top data is recorded from the position immediately after the recording end position of the bottom data, by referring to FIG. 18B.

Figure 18B:
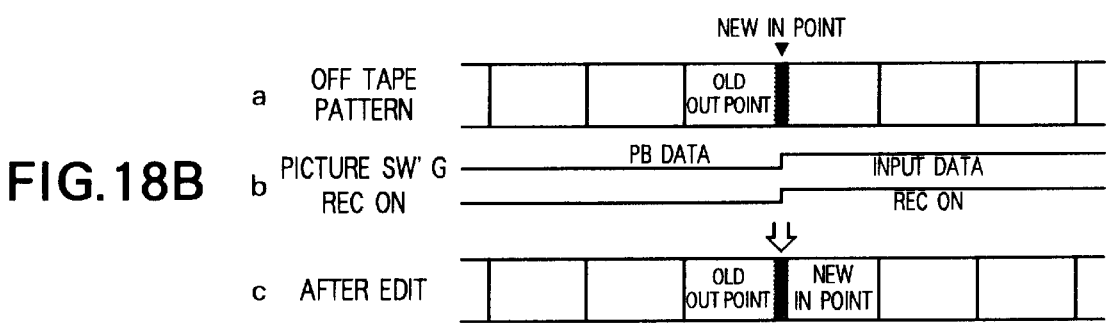

In the case shown in FIG. 18B, the edit damage of the tail part of the recording end GOP of the bottom data and the edit damage of the header part of the recording start position GOP of the new top data are superimposed on each other, so no particular problem occurs. Accordingly, the recording position control unit 68 performs control so that the switches 660 and 662 of the input data switching unit 66 respectively select the input terminals "a" and "a" from the new recording start point and simultaneously starts the recording on the tape. Accordingly, the switch timing of the input data switching unit 66 and the timing for actually starting the recording on the tape coincide as indicated by "b" of FIG. 18B, and no particular change is made in the recording position.

Next, an explanation will be made of the operation of the recording position control unit 68 where the end identification data of the synchronization block of the bottom data two GOP's preceding the position (New In Point) at which the start of recording of new top data was indicated by the editing apparatus 70 has the logical value "1", that is, the recording start position of the top data is recorded from the position two GOP's after the recording end GOP of the bottom data, by referring to FIG. 18C.

Figure 18C:
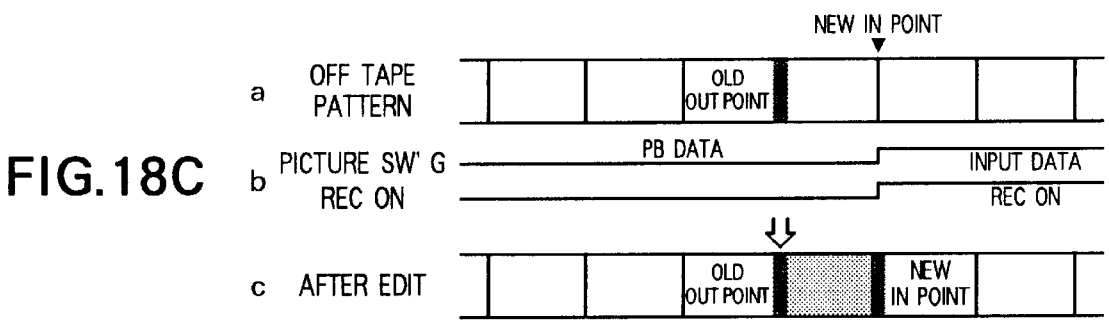

In the case shown in FIG. 18C, as much as two helical tracks worth of the tail part of the audio and/or video data of the GOP immediately after the recording end GOP of the bottom data may be overwritten by the top data and lost due to the track deviation by the new editing point.

On the other hand, in the audio and/or video data of the GOP immediately after the recording end GOP of the bottom data, there is a possibility that two helical tracks worth of the header part of the audio and/or video data has already been lost due to the edit damage produced in the tail part of the recording end GOP of the bottom data immediately before this and thus there is a possibility that a total of four helical tracks worth of the audio and/or video data, exceeding the error correction capability of the product code added by the recording system 14, will be lost.

Figure 18D:
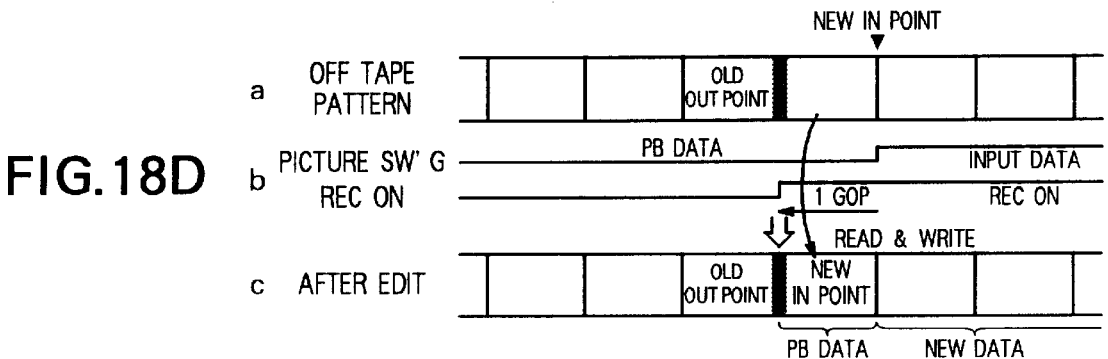

Therefore, in the case as shown in FIG. 18C, as shown in FIG. 18D, the position for starting the recording of the top data is made earlier by exactly the amount of one GOP and the loss of the data caused in the last GOP of the bottom data is reduced to the amount of two helical tracks under the same conditions as those shown in FIG. 18B, thereby to suppress the error to within the range of the error correction capability of the product code. Further, the bottom data which the reproduction unit 48 reproduced in advance by the reproducer head arranged on the drum preceding the recording head is overwritten on the last GOP (position on the same tape which was reproduced from in advance) of the bottom data, thereby to substantially prevent the forward deviation of the recording start position of the top data and hold the timing of the start of recording of the top data.

In order to realize such a change of the recording position, the control unit 60 activates the recording start signal (REC ON) so as to perform the recording by overwriting on the last GOP of the bottom data and controls the timing for starting the recording by the recording system 14.

Further, the recording position control unit 68 performs control so that the switches 660 and 662 of the input data switching unit 66 respectively select the input terminals "b" and "d" sides based on the editing point data detected by the ID detection circuit 510 of the reproduction system 50, and the noncompressed audio data obtained by having the video data expanded and decoded by the expansion and decoding system 58 again compressed and coded by the recording unit 10 and then reproduced is overwritten on the last GOP of the bottom data, and further outputs the edit ID for respectively making the logical values of the start identification data and the end identification data of the synchronization block overwritten on the last GOP of the bottom data "1" and "0" to the SYNC ID adding circuit 152 of the recording system 14.

Below, an explanation will be made of the operation of the control unit 60 and the recording position control unit 68 when editing a plurality of times, that is, when newly setting the recording end position near a GOP already having the recording end position information in the bottom data, by referring to FIGS. 19A to 19D.

First, an explanation will be made of the operation of the recording position control unit 68 where the end identification data of the synchronization block of the bottom data of the GOP immediately before the position (New In Point) at which the ending of recording of new top data was indicated by the editing apparatus 70 has the logical value "1", that is, the recording end position of the top data is recorded at the position immediately after the recording end GOP of the bottom data, by referring to FIG. 19A.

Figure 19A:
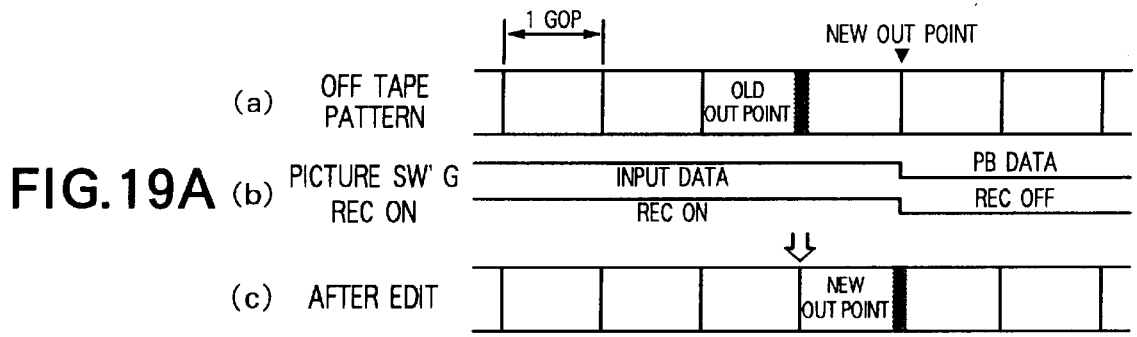
FIGS. 19A to 19D are views of the processing of the control unit and the recording position control unit where the recording end position of the top data is near a recording end GOP of the bottom data.

In the case shown in FIG. 19A, the edit damage produced in the tail part of the recording end GOP of the bottom data is repaired by the recording of the new top data, and edit damage is produced in the tail part of the recording end GOP of the new top data. That is, the edit damage is just shifted back by one GOP. No particular problem occurs in the recording of the top data. Accordingly, the recording position control unit 68 performs control so that the switches 660 and 662 of the input data switching unit 66 respectively select the input terminals "a" and "c" up to the new recording end point and simultaneously actually ends the recording on the tape. Accordingly, the switch timing of the input data switching unit 66 and the timing for actually ending the recording on the tape coincide as indicated by "b" of FIG. 19A, and no particular change is made in the recording position.

Next, an explanation will be made of the operation of the recording position control unit 68 where the end identification data of the synchronization block of the bottom data of the GOP exactly the same in position as the position (New In Point) at which the ending of recording of new top data was indicated by the editing apparatus 70 has the logical value "1", that is, the recording end position of the top data is recorded at the recording end position of the bottom data, by referring to FIG. 19B.

Figure 19B:
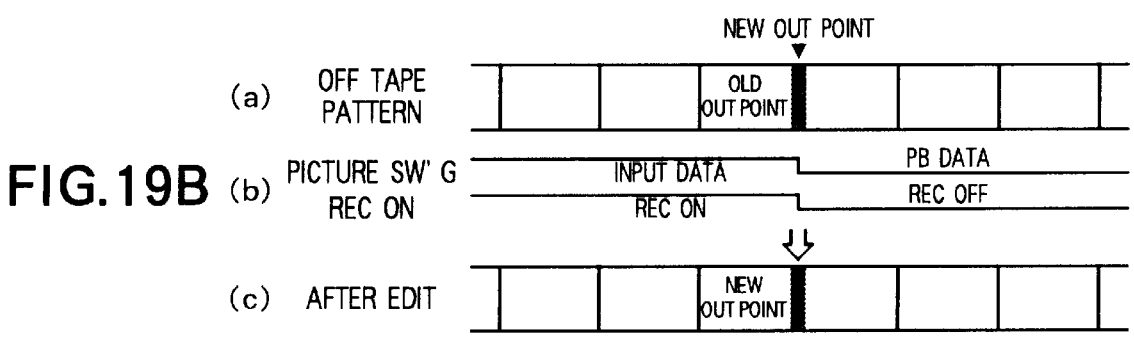

In the case shown in FIG. 19B, the edit damage of the tail part of the recording end GOP of the bottom data and the edit damage of the tail part of the recording end GOP of new top data are superimposed on each other, so no particular problem occurs. Accordingly, the recording position control unit 68 performs control 80 that the switches 660 and 662 of the input data switching unit 66 respectively select the input terminals "a", and "c" up to the new recording end point and simultaneously ends the recording on the tape. Accordingly, the switch timing of the input data switching unit 66 and the timing for actually ending the recording on the tape coincide as indicated by "b" of FIG. 19B, and no particular change is made in the recording position.

Next, an explanation will be made of the operation of the recording position control unit 66 where the end identification data of the synchronization block of the bottom data of the GOP next to the position (New In Point) at which the ending of recording of new top data was indicated by the editing apparatus 70 has the logical value "1", that is, the recording end position of the top data is recorded at the position immediately before the recording end GOP of the bottom data, by referring to FIG. 19C.

Figure 19C:
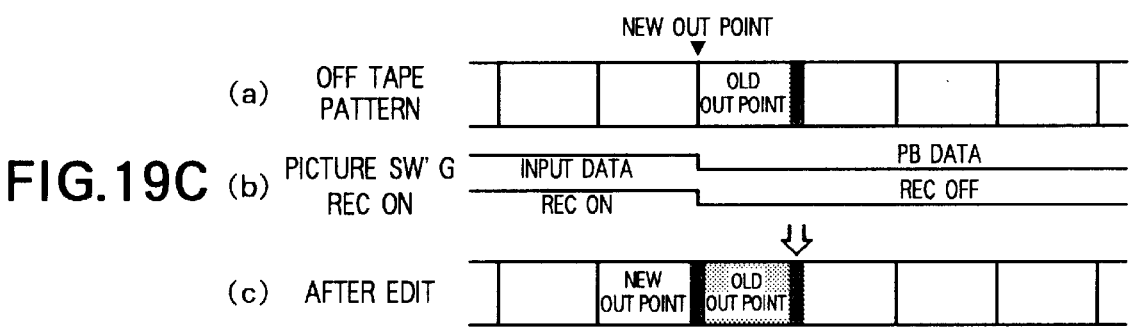

In the case shown in FIG. 19C, there is a possibility that as much as two helical tracks worth of the tail part of the audio and/or video data of the recording end GOP of the bottom data will be overwritten by the top data and lost due to the track deviation by the new editing point.

Further, similar to the case of just erasing the first track at the start of recording shown in FIG. 17A and preventing the same azimuth tracks from adjoining each other and the loss of data of three helical tracks, the erasing is carried out only for the final track at the recording end point. Accordingly, in the already existing recording end GOP (Old Out Point), since the erasing has been only carried out for the final track in the past editing work, there is a possibility of loss of three helical tracks worth of the audio and/or video data together with the overwriting of two tracks by the new editing point mentioned above.

Figure 19D:
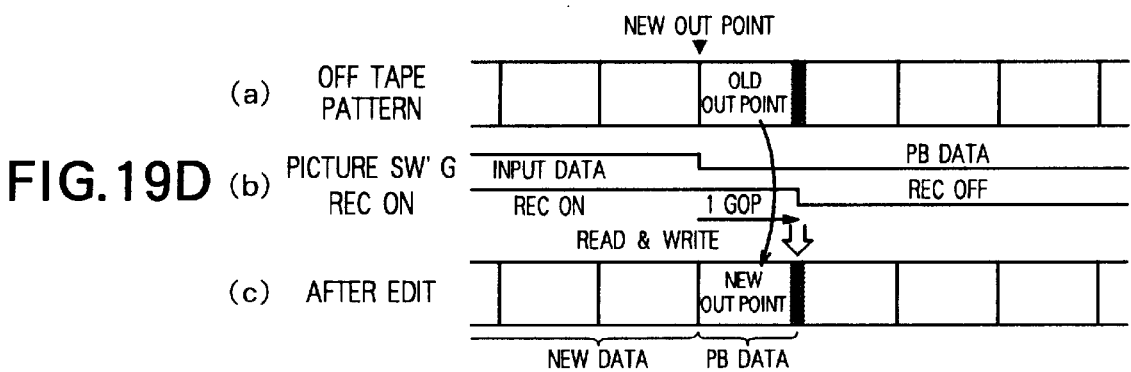

Therefore, in the case as shown in FIG. 19C, as shown in FIG. 19D, the position for ending the recording of the top data is made later by exactly the amount of one GOP and the loss of the data caused in the first GOP of the bottom data is reduced to the amount of two helical tracks under the same conditions as those shown in FIG. 19B, thereby to suppress the error to within the range of the error correction capability of the product code. Further, the bottom data which the reproduction unit 40 reproduced in advance by the reproducer head arranged on the drum preceding the recording head is overwritten on the recording end GOP (position on the same tape which was reproduced from in advance) of the bottom data, thereby to substantially prevent the backward deviation of the recording end position of the top data and hold the timing of the start of recording of the top data.

In order to realize such a change of the recording position, the control unit 60 activates the recording start signal (REC ON) so as to perform the recording by overwriting on the recording end GOP of the bottom data and controls the timing for ending the recording by the recording system 14.

Further, the recording position control unit 68 performs control so that the switches 660 and 662 of the input data switching unit 66 respectively select the input terminals "b" and "d" based on the editing point data detected by the ID detection circuit 510 of the reproduction system 50 and so that the noncompressed audio data obtained by having the video data expanded and decoded by the expansion and decoding system 58 again compressed and coded by the recording unit 10 and then reproduced is overwritten on the recording end GOP of the bottom data and further outputs the edit ID respectively making the logical values of the start identification data and the end identification data of the synchronization block overwritten on the recording end GOP of the bottom data "0" and "1" to the SYNC ID adding circuit 152 of the recording system 14.

Below, an explanation will be made of the operation of the control unit 60 and the recording position control unit 68 when editing a plurality of times, that is, newly setting a recording end position near a GOP already having the recording start position information in the bottom data, by referring to FIGS. 20A to 20D.

First, an explanation will be made of the operation of the recording position control unit 68 where the start identification data of the synchronization block of the bottom data of the GOP exactly the same in position as the position (New In Point) at which the ending of recording of new top data was indicated by the editing apparatus 70 has the logical value "1", that is, the recording end position of the top data is recorded at the recording start GOP of the bottom data, by referring to FIG. 20A.

Figure 20A:
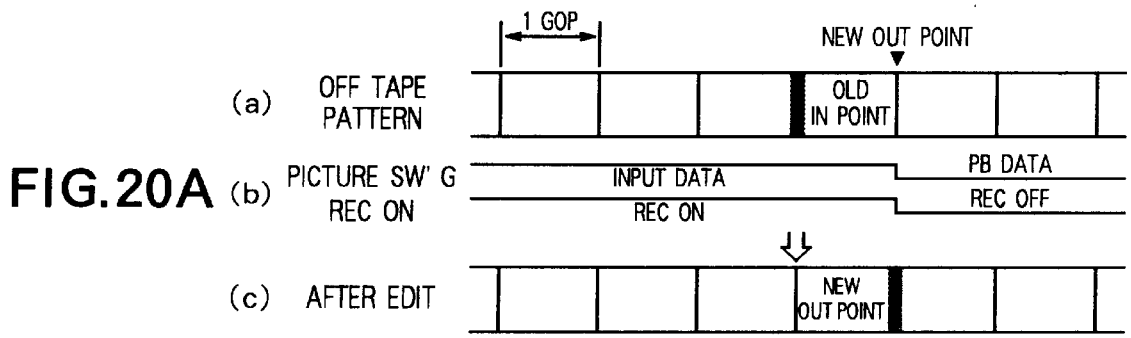
FIGS. 20A to 20D are views of the processing of the control unit and the recording position control unit where the recording at the recording end position of the top data ends near a recording start GOP of the bottom data.

In the case shown in FIG. 20A, the edit damage produced in the header part of the recording start GOP of the bottom data is repaired by the recording of new top data, and edit damage is produced in the tail part of the recording end GOP of the top data, therefore no particular problem occurs. Accordingly, the recording position control unit 68 performs control so that the switches 660 and 662 of the input data switching unit 66 respectively select the input terminals "a" and "c" up to the new recording end point and simultaneously actually ends the recording on the tape. Accordingly, the switch timing of the input data switching unit 66 and the timing for actually ending the recording on the tape coincide as indicated by "b" of FIG. 20A, and no particular change is made in the recording position.

Next, an explanation will be made of the operation of the recording position control unit 68 where the start identification data of the synchronization block of the bottom data of the GOP immediately after the position (New In Point) at which the ending of recording of new top data was indicated by the editing apparatus 70 has the logical value "1", that is, the recording end position of the top data is recorded at the position immediately before the recording start GOP of the bottom data, by referring to FIG. 20B.

Figure 20B:
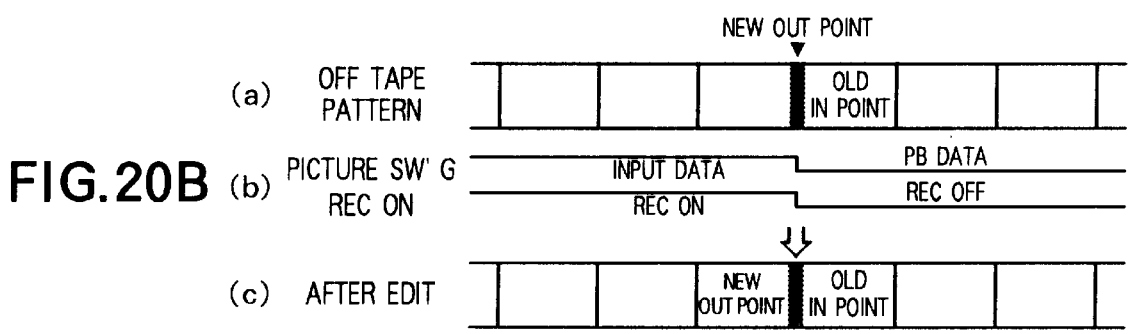

In the case shown in FIG. 20B, the edit damage of the header part of the recording start GOP of the bottom data and the edit damage of the tail part of the recording end GOP of the top data are superimposed on each other, so no particular problem occurs. Accordingly, the recording position control unit 68 performs control so that the switches 660 and 662 of the input data switching unit 66 respectively select the input terminals "a" and "c" up to the new recording end point and simultaneously actually ends the recording on the tape. Accordingly, the switch timing of the input data switching unit 66 and the timing for actually ending the recording on the tape coincide as indicated by "b" of FIG. 20B, and no particular change is made in the recording position.

Next, an explanation will be made of the operation of the recording position control unit 68 where the start identification data of the synchronization block of the bottom data at the position two GOP's after the position (New In Point) at which the ending of recording of new top data was indicated by the editing apparatus 70 has the logical value "1", that is, the recording end position of the top data is set at the position two GOP's before the recording start GOP of the bottom data, by referring to FIG. 20C.

Figure 20C:
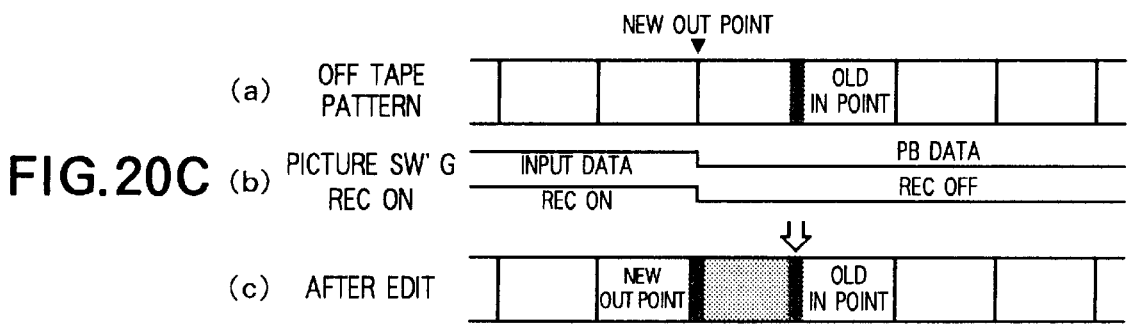

In the case shown in FIG. 20C, the audio and/or video data of GOP of the bottom data immediately after the recording end GOP of the top data may be over written and lack in its tail part in amount of two helical tracks at the maximum by the top data due to the track deviation by the new editing point.

On the other hand, in the audio and/or video data of the GOP immediately before the recording start GOP of the bottom data, there is a possibility that two helical tracks worth of the audio and/or video data has been already lost due to the edit damage produced in the header part of the recording start GOP of the bottom data immediately after this and therefore there is a possibility that four helical tracks worth of the audio and/or video data, exceeding the error correction capability of the product code added by the recording system 14, will be lost in total.

Figure 20D:
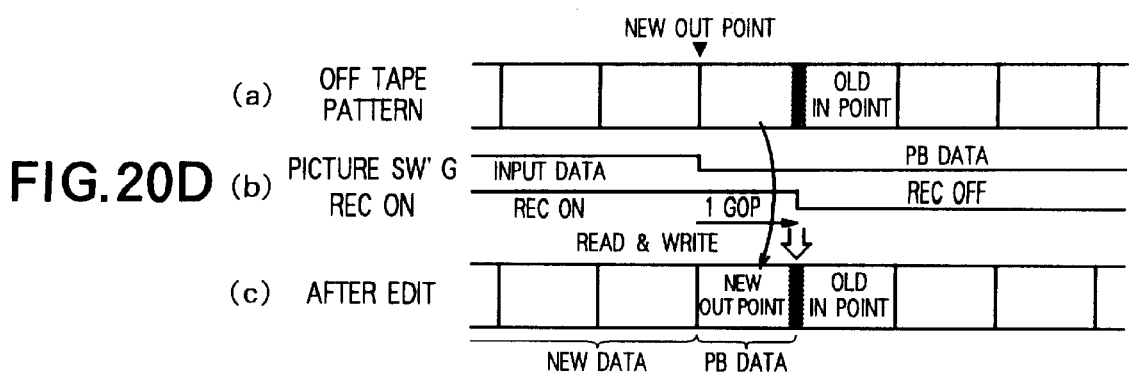

Therefore, in the case as shown in FIG. 20C, as shown in FIG. 20D, the position for ending the recording of the top data is made later by exactly the amount of one GOP and the loss of the data caused in the first GOP of the bottom data is reduced to the amount of two helical tracks under the same conditions as those shown in FIG. 20B, thereby to suppress the error to within the range of the error correction capability of the product code. Further, the bottom data which the reproduction unit 48 reproduced in advance by the reproducer head arranged on the drum preceding the recording head is overwritten on the GOP (position on the same tape which was reproduced from in advance) of the bottom data immediately after the recording end GOP of the top data, thereby to substantially prevent the backward deviation of the recording end position of the top data and hold the timing of the ending of recording of the top data.

In order to realize such a change of the recording position, the control unit 60 activates the recording start signal (REC ON) so as to perform the recording by overwriting on the GOP of the bottom data immediately after the recording end GOP of the top data and controls the timing for starting the recording by the recording system 14.

Further, the recording position control unit 68 performs control so that the switches 660 and 662 of the input data switching unit 66 respectively select the input terminals "b" and "d" sides based on the editing point data detected by the ID detection circuit 510 of the reproduction system 50 and so that the noncompressed audio data obtained by having the video data expanded and decoded by the expansion and decoding system 58 again compressed and coded by the recording unit 10 and then reproduced is overwritten on the first GOP of the bottom data and further outputs the edit ID respectively making the logical values of the start identification data and the end identification data of the synchronization block overwritten on the first GOP of the bottom data "0" and "1" to the SYNC ID adding circuit 152 of the recording system 14.

Note that, the control unit 60 and the recording position control unit 68 do not have to perform the control for change of the recording position except in the cases shown in FIG. 16C and FIG. 18C to FIG. 20C.

Below, the processing of the recording position control unit 68 will be further explained by referring to FIG. 21 and FIG. 22.

Figure 21:
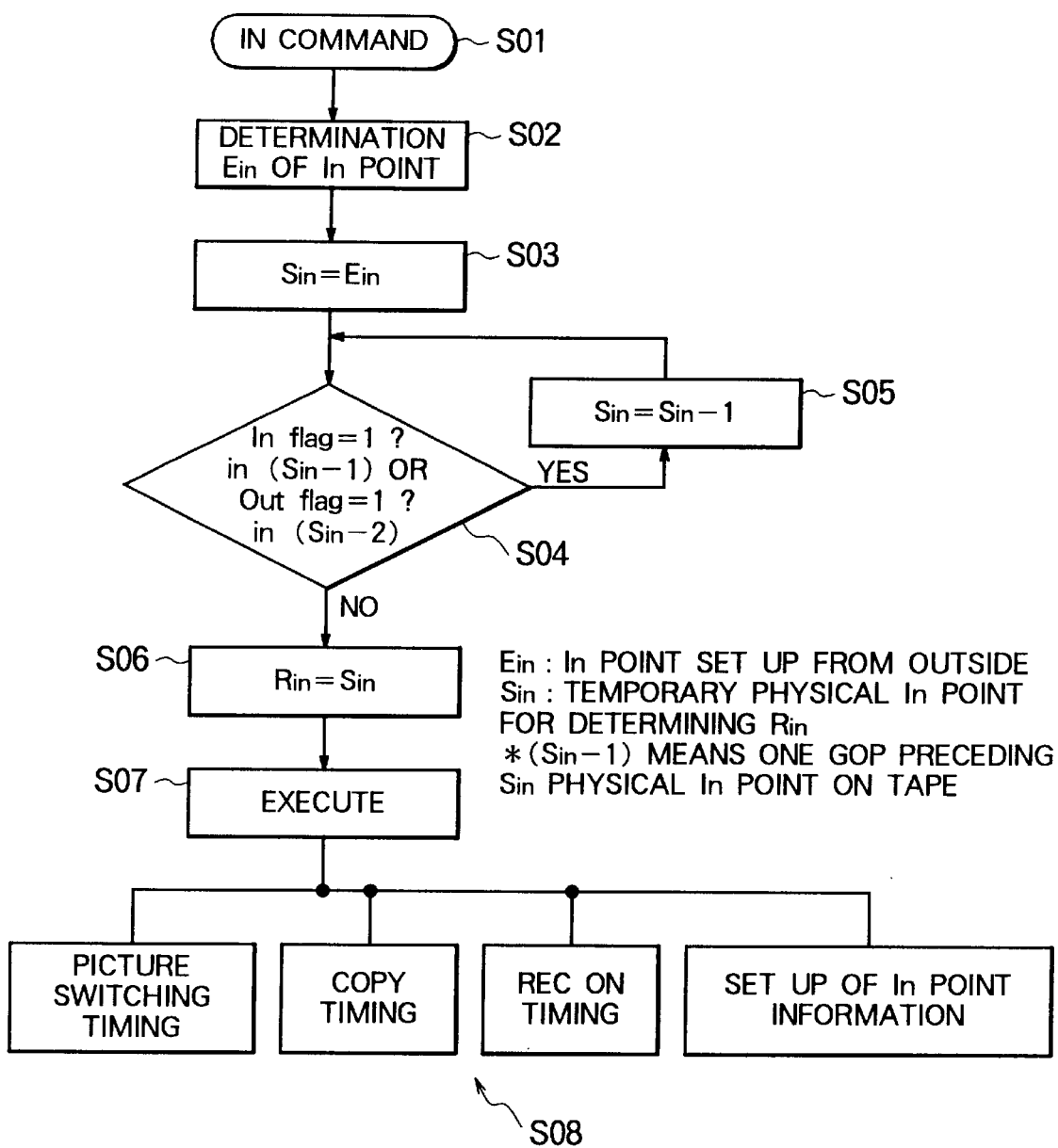
FIG. 21 is a view of the processing of the recording position control unit and the control unit where a start of recording of the top data is requested from am editing apparatus (FIG. 13) (FIGS. 16A to 16D and FIGS. 18A to 18D)

FIG. 21 is a view of the processing of the recording position control unit 68 and the control unit 60 of the case where the start of recording of the top data is requested (FIGS. 16A to 16D and FIGS. 18A to 18D) from the editing apparatus 70 (FIG. 13).

As shown in FIG. 21, at step 01 (S01), the start of recording of the top data is requested by the editing apparatus 70 to the recording position control unit 68.

At step 02 (S02), the editing apparatus 70 determines the recording start point (In Point) of the top data.

At step 03 (S03), the recording position control unit 68 defines the recording start point input from the editing apparatus 70 as a temporary recording start point.

At step 04 (S04), the recording position control unit 68 judges the editing point data of the edit ID input from the ID detection circuit 510 of the reproduction system 50. Where the start identification data (EDIT IN POINT) of the GOP immediately before the temporary recording start point has the logical value "1" or where the end identification data (EDIT OUT POINT) of the GOP two places preceding the temporary recording start point has the logical value "1", the operation routine proceeds to the processing of S05. The operation routine proceeds to the processing of S06 in cases other than this.

At step 05 (S05), the recording position control unit 68 shifts the temporary recording start point to the front by exactly the amount of one GOP.

At step 06 (S06), the recording position control unit 68 defines the temporary recording start point as an actual recording start point.

At step 07 (S07). the recording position control unit 68 and the control unit 60 start the recording (edit) processing of the top data with respect to the VTR tape 2.

At step 08 (S08), the recording position control unit 68 and the control unit 60 perform the processing such as the switch control with respect to the input data switching unit 66, the control of the timing of recording, the generation of the recording start signal, and the set up of the editing point data.

Figure 22:
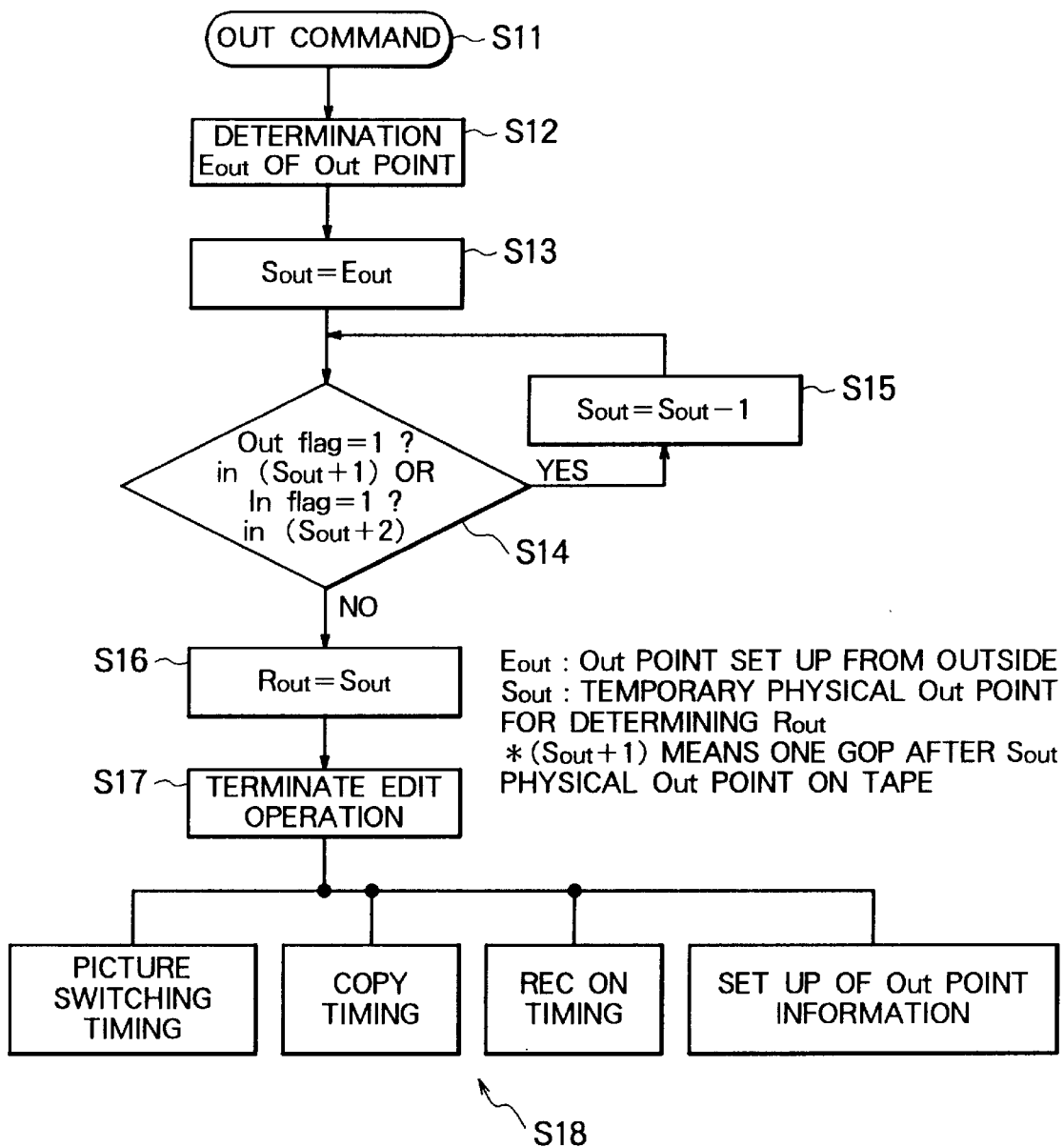
FIG. 22 is a view of the processing of the recording position control unit and the control unit where an end of recording of the top data is requested from the editing apparatus (FIG. 13) (FIGS. 19A to 19D and FIGS. 20A to 20D)

FIG. 22 in a view of the processing of the recording position control unit 66 and the control unit 60 where the end of the recording of the top data is requested (FIGS. 19A to 19D and FIGS. 20A to 20D) from the editing apparatus 70 (FIG. 13).

An shown in FIG. 22, at step 11 (S11), the end of recording of the top data is requested by the editing apparatus 70 to the recording position control unit 68.

At step 22 (S22), the editing apparatus 70 determines the recording end point (Out Point) of the top data.

At step 13 (S13), the recording position control unit 68 defines the recording end point input from the editing apparatus 70 as the temporary recording end point.

At step 14 (S14), the recording position control unit 68 judges the editing point data of the edit ID input from the ID detection circuit 510 of the reproduction system 50. Where the end identification data (EDIT OUT POINT) of the GOP immediately after the temporary recording end point has the logical value "1" or where the start identification data (EDIT IN POINT) two GOP's after the temporary recording end point has the logical value "1", the operation routine proceeds to the processing of S15. The operation routine proceeds to the processing of S16 in cases other than this.

At step 15 (S15), the recording position control unit 68 shifts the temporary recording end point to the back by exactly the amount of one GOP.

At step 16 (S16), the recording position control unit 68 defines the temporary recording end point as an actual recording end point.

At step 17 (S17), the recording position control unit 68 and the control unit 60 end the recording (edit) processing of the top data with respect to the VTR tape 2.

At step 18 (S18), the recording position control unit 68 and the control unit 60 perform processing such as the switch control with respect to the input data switching unit 66, the control of the timing of recording, the generation of the recording end signal, and the set up of the editing point data.

The SYNC ID adding circuit 152 adds the edit ID set from the recording position control unit 68 to the synchronization block as mentioned above and further divides the same corresponding to the helical tracks of the VTR tape 2, adds the synchronization data SYNC etc. to this, and, at the same time, performs the interleaving and the track replacement.

The inner code encoder circuit 154 generates the inner code (FIGS. 7A to 7D) with respect to the audio and/or video data, adds this to the synchronization block, and outputs the same to the recording head unit 20.

The recording head unit 20 records the audio and/or video data to which the inner code is added on the helical tracks of the VTR tape 2.

Below, an explanation will be made of the operation of the VCR 3 at the time of reproduction.

Each of the reproducer heads 400, 402, 404, and 406 (FIG. 4B) of the reproducer head unit 40 reproduces the audio and/or video data from the VTR tape 2.

The inner code decoder circuit 500 detects the data error by using the inner code contained in the audio and/or video data reproduced by each of the reproducer heads 400, 402, 404, and 406 and corrects the data error.

The ID detection circuit 510 separates the identification data ID (FIG. 10 and FIG. 12) from the synchronization block of the audio and/or video data, outputs the same to the write address control circuit 514 and the recording position control unit 68, and outputs the audio and/or video data to the nontracking control circuit 512.

The nontracking control circuit 512 performs the nontracking control processing by using the system auxiliary data and stores the audio and/or video data free from data error in the memory circuit 560 with priority in the inner code decoder circuit.

The de-interleaving ROM circuit 516 and the write address control circuit 514 perform the de-interleaving processing with respect to the audio and/or video data stored in the memory circuit 560.

The outer code decoder circuit 518 performs the error correction of the audio and/or video data using the outer code for the deinterleaved audio and/or video data and stores the audio and/or video data in the jog memory circuit 562. The error flag is added to the data for which the error correction could not be carried out and is stored in the jog memory circuit 562.

The deshuffling ROM circuit 520 and the read address control circuit 522 perform the deshuffling processing for returning the arrangement of the audio and/or video data stored in the jog memory circuit 562 to the arrangement at the time of the recording. Further, the read address control circuit 522 generates the read address for special reproduction such an jog shuttle reproduction in response to a request of the control unit 60.

The de-packing circuit 524 separates the audio data from the audio and/or video data output by the jog memory circuit 562 and outputs the same to the external video processing apparatus and separates the video data and outputs the same to the expansion and decoding system 58. Further, the de-packing circuit 524 separates the 78 bytes of the management data used by the user for managing the VTR tape 2 among the system auxiliary data and outputs the same to the control unit 60.

The expansion and decoding system 58 performs the expansion and decoding for the compressed video data and outputs the same as the video data to the external video processing apparatus. Further, the expansion and decoding system 58 performs the interpolation of the video data according to need and corrects the loss of the image.

As explained above, according to the VCR 3 of the nontracking system editing can be carried out, and in addition, deterioration of the video near the editing point where a plurality of sets of video data are connected can be prevented.

Further, the configuration of the VCR 3 is an example. It does not matter whether each constituent part is constituted by hardware or constituted by software so long as the required function and performances can be secured.

Third Embodiment

According to the operation of the VCR 3 shown in the second embodiment, it is possible to connect the video data and perform editing in units of GOP's. However, in a television broadcasting station etc., editing of the video data in units of frames is required.

Below, an explanation will be made of a modification of the operation of the VCR 3 shown in the second embodiment enabling the editing of the audio and/or video data not only in units of GOP's, but also in units of frames.

FIGS. 23A to 23J are views of the operation of the VCR 3 in the third embodiment (FIG. 13 to FIG. 15).

Below, an explanation will be made of the operation of the VCR 3 when performing the editing in units of frames.

The editing apparatus 70 inputs the edit control signal for indicating the recording start point (In Point) or the recording end point (Out Point) of the top data to the recording position control unit 68 and the control unit 60.

The control unit 60 controls the recording unit 10 based on the edit control data and the operation data from the editing apparatus 70 and the data input from the constituent parts of the VCR 3 to start the recording of the audio and/or video data, controls the reproduction unit 48 to start the reproduction of the bottom data, and further outputs the recording start signal (REC ON) to the recording system 14.

The reproduction system 50 of the reproduction unit 48 sequentially reproduces the synchronization blocks accommodating the bottom data which has been already recorded on the VTR tape 2 preceding the recording of the top data on the VTR tape 2 by the recording unit 10, outputs the reproduced compressed video data to the expansion and decoding system 58, and outputs the audio data to the input data switching unit, 66.

The expansion and decoding system 58 expands and decodes the compressed video data reproduced by the reproduction system 50 as shown in FIG. 23A and further generates the GOP data in synchronization with the phase of the GOP of the reproduced compressed video data and the frame contained in the GOP as shown in FIG. 23B.

Below, an explanation will be made of a case where the part to be recorded on the bottom data in an overlapping manner (insert video) among the top data generated by the compression and coding system 12 is inserted into a portion from the middle of the GOP2 of the bottom data to the middle of the GOP4.

In such a case, the recording position control unit 68 generates the switch control signal as shown in FIG. 23D, makes the switches 660 and 662 select the input terminals "b" and "d" side respectively in a period where the switch control signal has the logical value "0" (ADV PB) to supply the video data expanded and decoded by the expansion and decoding system 58 and the audio data reproduced by the reproduction system 50 to the compression and coding system 12, and makes the switches 660 and 662 to select the input terminals "a" and "c" side, respectively during a period where the switch control signal has the logical value "1" (INPUT) to supply the noncompressed video data input from the outside to the compression and coding system 12.

That is, as shown in FIG. 23E, the recording position control unit 68 controls the switches 660 and 662, switches the video data expanded and decoded by the expansion and decoding system 58 (B-frames of GOP2 and I-frames of GOP4 of FIG. 23A) and the noncompressed video data input from the outside (insert video of FIG. 23C) in units of frames, supplies them to the compression and coding system 12, and compresses and codes the same, whereby the editing in units of frames becomes possible.

The compression and coding system 12 compresses and codes the switched and supplied video data an shown in FIG. 23E in units of GOP's as shown in FIG. 23F, further makes them equal in length in units of GOP's, and generates the top data. Note that, as shown in FIG. 23F, a delay due to the compression and coding processing is caused in the video data compressed and coded by the compression and coding system 12.

The recording system 14 matches the timings of the video data compressed and coded by the compression and coding system 12 and the audio data input from the outside, further gives a delay to this as shown in FIG. 23G, and generates a recording signal in synchronization with the GOP data shown in FIG. 23B.

The control unit 60 activates the recording start signal (REC ON) at the timing shown in FIG. 23H and controls the recording system 14 to record the recording signal on the VTR tape 2.

By the operation of the VCR 3 explained above, the top data (GOP2A to GOP4A) is inserted into the bottom data (GOP1 to GOP5) shown in FIG. 23I as shown in FIG. 23(J) and recorded on the VTR tape 2.

By operating the VCR 3 as explained above in the third embodiment, it in possible to performing editing by connecting the video data in units of the frames contained in the GOP's.

Note that, the frame type sequence of GOP's shown in the second and third embodiments is an example. The VCR's 1 and 3 according to the present invention can be applied to the editing of the compressed video data of other frame type sequences by making suitable changes.

As explained above, according to the video data recording and reproducing apparatus and method of the same explained above, the quality of the video after reproduction is not lowered even if the boundaries of the GOP's of the bottom data and the top data are not precisely matched at an editing point of the video data when recording a plurality of video data in an overlapped manner.

Further, according to the video data recording and reproducing apparatus and method of the same explained above, a reduction of the quality of the video at the editing point can be prevented without a necessity of a high precision in the tape travelling control and a high mechanical precision with respect to the tape travelling system.

What is claimed is:

1. A video data recording and reproducing apparatus comprising:
   a video data accommodating means for accommodating video data in a predetermined part of a predetermined recording block in predetermined recording units containing one or more frames;

an error correction code adding means for generating an error correction code which enables reproduction of each of the recording units of the video data housed in the recording block even if two or more helical tracks worth of data is lost for every recording unit and adding the same to a predetermined part of the recording block;

a start/end identification data adding means for adding start/end identification data indicating the start or recording and the end of recording of the video data to a predetermined part of the recording block;

a recording means for recording each of the recording blocks accommodating the recording units of the video data and to which the error correction code and the start/end identification data are added over a plurality of helical tracks of the tape recording medium; and a reproducing means for reproducing the recording blocks which have been already recorded on the tape recording medium, wherein when recording other video data (top data) on a tape recording medium on which video data (bottom data) has already been recorded, the recording means starts or ends the recording at a position of the tape recording medium at which the loss of the top data and the bottom data caused due to the recording of the top data does not exceed the error correction capability of the error correction code in accordance with the start/end identification data which had been added to the reproduced recording blocks accommodating the bottom data and the recording blocks accommodating the top data.

2. A video data recording and reproducing apparatus as set forth in claim 1, wherein the recording means starts the recording of the recording blocks accommodating the recording units of the top data, when the start/end identification data added to a recording block accommodating the bottom data indicates the start of the bottom data, from a helical track after the helical track of the tape recording medium on which the next recording block for accommodating the bottom data is recorded;

ends the recording of the recording blocks accommodating the recording units of the top data, when the start/end identification data added to a recording block accommodating the bottom data indicates the end of the bottom data, before the helical track of the tape recording medium on which the immediately previous recording block accommodating the bottom data is recorded;

ends the recording of the recording block accommodating the recordings unit of the top data, when the start/end identification data added to a recording block accommodating the bottom data indicates the start of the bottom data, at a helical track before the helical track of the tape recording medium on which the previous recording block accommodating the bottom data by two is recorded;

starts the recording of the recording blocks accommodating the recording units of the top data, when the start/end identification data added to a recording block accommodating the bottom data indicates the start of the bottom data, after the helical track of the tape recording medium on which the next recording block accommodating the bottom data is recorded; and records the recording blocks reproduced from the tape recording medium by the reproducing means on the helical tracks adjoining the positions of the tape recording medium starting and ending the recording of the top data.

3. A video data recording and reproducing apparatus as set forth in claim 1, wherein further comparising a separating means for separating the recording units of the video data, the error correction code, and the start/end identification data from each of the reproduced recording blocks; and an error correcting means for performing error correction on the recording units of the video data using the separated error correction code.

4. A video data recording and reproducing apparatus as set forth in claim 3, wherein the reproducing means has a plurality of data reading means each of which has two reproducer heads scanning the tape recording medium at one helical track's worth of distance from each other for reading the recording blocks from the helical tracks of the tape recording medium by both of the reproducer heads regardless of the position of the track;

the separating means separates the recording units of the video data, the error correction code, and the start/end identification data from each of the recording blocks as read by both of the two reproducer heads of the plurality of data reading means;

the error correcting means performs the error correction on the recording units of the video data separated from each of the recording blocks as read by both of the two reproducer heads of the plurality of data reading means; and there is further provided a selecting means for selecting with priority the video data in which there is no data error from among the video data separated from each of the recording blocks read as by both of the two reproducer heads of the plurality of data reading means.

5. A video data recording and reproducing apparatus as set forth in claim 3, wherein further comprising a compressing means for compressing the video data in the recording units; and an expanding means for expanding the error-corrected video data.

6. A video data recording and reproducing apparatus comprising:

reproducing means for reproducing prerecorded video data from a number of tracks of a tape recording medium preceding the recording of new noncompressed video data to be input on the tape recording medium;

switching means for switching and outputting the reproduced prerecorded video data and the new video data in units of frames;

compressing means for compressing the switched and output prerecorded video data and new video data in units of GOPs; and recording means for recording the compressed prerecorded video data and new video data on the tape recording medium, in which the prerecorded video data is only recorded on one of a top portion and a bottom portion of the number of tracks of the tape recording medium and in which the new video data is recorded on only the other of the top portion and the bottom portion of the number of tracks of the tape recording medium.

7. A video data recording and reproducing method including the steps of accommodating video data in a predetermined part of a predetermined recording block in predetermined recording units containing one or more frames;

generating an error correction code which enables reproduction of each of the recording units of the video data housed in the recording block even if two or more helical tracks worth of data in lost for every recording unit and adding the same to a predetermined part of the recording block;

adding start/end identification data indicating the start or recording and the end of recording of the video data to a predetermined part of the recording block; recording each of the recording blocks accommodating the recording units of the video data and to which the error correction code and the start/end identification data are added over a plurality of helical tracks of the tape recording medium; and reproducing the recording blocks which have been already recorded on the tape recording medium, wherein when recording other video data (top data) on a tape recording medium on which video data (bottom data) has already been recorded, the recording is started or ended at a position of the tape recording medium at which the loss of the top data and the bottom data caused due to the recording of the top data does not exceed the error correction capability of the error correction code in accordance with the start/end identification data which had been added to the reproduced recording blocks accommodating the bottom data and the recording blocks accommodating the top data.

8. A video data recording and reproducing method according to claim 7, further including steps of:

starting the recording of the recording blocks accommodating the recording units of the top data, when the start/end identification data added to a recording block accommodating the bottom data indicates the start of the bottom data, from a helical track after the helical track of the tape recording medium on which the next recording block for accommodating the bottom data is recorded;

ending the recording of the recording blocks accommodating the recording units of the top data, when the start/end identification data added to a recording block accommodating the bottom data indicates the end of the bottom data, before the helical track of the tape recording medium on which the immediately previous recording block accommodating the bottom data is recorded;

ending the recording of the recording block accommodating the recordings unit of the top data, when the start/end identification data added to a recording block accommodating the bottom data indicates the start of the bottom data, at a helical track before the helical track of the tape recording medium on which the previous recording block accommodating the bottom data by two is recorded; and starting the recording of the recording blocks accommodating the recording units of the top data, when the start/end identification data added to a recording block accommodating the bottom data indicates the start of the bottom data, after the helical track of the tape recording medium on which the next recording block accommodating the bottom data is recorded.

* * * * *